US010127088B2

(12) United States Patent
Kogan et al.

(10) Patent No.: US 10,127,088 B2
(45) Date of Patent: Nov. 13, 2018

(54) ADAPTIVE TECHNIQUES FOR IMPROVING PERFORMANCE OF HARDWARE TRANSACTIONS ON MULTI-SOCKET MACHINES

(71) Applicant: Oracle International Corporation, Redwood City, CA (US)

(72) Inventors: Alex Kogan, Needham, MA (US); Victor M. Luchangco, Burlington, MA (US); Yosef Lev, New York, NY (US); Trevor Brown, Toronto (CA)

(73) Assignee: Oracle Inrternational Corporation, Redwood City, CA (US)

( * ) Notice: Subject to any disclaimer, the term of this patent is extended or adjusted under 35 U.S.C. 154(b) by 241 days.

(21) Appl. No.: 15/263,123

(22) Filed: Sep. 12, 2016

(65) Prior Publication Data

US 2017/0075720 A1     Mar. 16, 2017

Related U.S. Application Data

(60) Provisional application No. 62/216,994, filed on Sep. 10, 2015.

(51) Int. Cl.
*G06F 9/52* (2006.01)
*G06F 9/50* (2006.01)
*H04Q 3/545* (2006.01)

(52) U.S. Cl.
CPC ......... *G06F 9/528* (2013.01); *H04Q 3/54541* (2013.01); *G06F 9/5027* (2013.01)

(58) Field of Classification Search
CPC .... G06F 9/528; G06F 9/5027; H04Q 3/54541
See application file for complete search history.

(56) References Cited

U.S. PATENT DOCUMENTS 8,544,014 B2    9/2013 Gopalan et al.
9,430,388 B2    8/2016 Yamauchi et al.
(Continued)

OTHER PUBLICATIONS

Karnagel et al. Improving In-Memory Database Index Performance with Intel Transactional Synchronization. [online] (2014). Intel., pp. 1-12. Retrieved From the Internet <file:///C:/Users/jlabud/Documents/e-Red%20Folder/15263123/Cost%20of%20Concurrency%20in%20Hybrid%20Transactional%20Memory.pdf> (Year: 2014).*

(Continued)

*Primary Examiner* — Emerson C Puente
*Assistant Examiner* — Jonathan R Labud
(74) *Attorney, Agent, or Firm* — Robert C. Kowert; Meyertons, Hood, Kivlin, Kowert & Goetzel, P.C.

(57) ABSTRACT

Socket scheduling modes may prevent non-uniform memory access effects from negatively affecting performance of synchronization mechanisms utilizing hardware transactional memory. Each mode may indicate whether a thread may execute a critical section on a particular socket. For example, under transitional lock elision, locks may include a mode indicating whether threads may acquire or elide the lock on a particular socket. Different modes may be used alternately to prevent threads from starving. A thread may only execute a critical section on a particular socket if allowed by the current mode. Otherwise, threads may block until allowed to execute the critical section, such as after the current mode changes. A profiling session may, for a running workload, iterate over all possible modes, measuring statistics pertaining to the execution of critical sections (e.g., the number of lock acquisitions and/or elisions), to determine the best performing modes for the particular workload.

20 Claims, 19 Drawing Sheets

(56) References Cited

U.S. PATENT DOCUMENTS

| | | |
|---|---|---|
| 2008/0120622 A1 | 5/2008 | Follis et al. |
| 2008/0172398 A1 | 7/2008 | Borkenhagen et al. |
| 2009/0044194 A1 | 2/2009 | Rathi |
| 2009/0138890 A1 | 5/2009 | Blake et al. |
| 2010/0088703 A1 | 4/2010 | Whitfield et al. |
| 2015/0067250 A1 | 3/2015 | Henry et al. |

OTHER PUBLICATIONS

William J. Bolosky, et al., "Simple but Effective Techniques for NUMA Memory Management", ACM SIGOPS Operating Systems Review 23, No. 5., 1989, pp. 1-13.

Irina Calciu, et al., "Message Passing or Shared Memory: Evaluating the Delegation Abstraction for Multicores", International Conference on Principles of Distributed Systems, Springer International Publishing, 2013, pp. 83-97.

Baptiste Lepers, et al., "Thread and Memory Placement on NUMA Systems: Asymmetry Matters", In the Proceedings of the 2015 USENIX Annual Technical Conference (USENIC ATC '15), Jul. 8-10, 2015, pp. 277-289.

Bergey Blagordurov, et al., "A Case for NUMA-aware Contention Management on Multicore Systems", Proceedings of the 19th International Conference on parallel Architectures and Compilation Techniques, ACM, 2010, pp. 1-15.

Nuno Diegues, et al., "Self-Tuning Intel Transactional Synchronization Extensions", Proceedings of the 11th International Conference on Autonomic Computing (ICAC '14), Jun. 18-20, 2014, USENIX Association, pp. 209-219.

Nuno Diegues, et al., "Virtues and Limitations of Commodity Hardware Transactional Memory", ACM, PACT'14, Aug. 24-27, 214, pp. 1-12.

Yehuda Afek, et al., "Software-Improved Hardware Lock Elision", ACM, PODC'14, Jul. 15-18, 2014, pp. 1-10.

David Dice, et al., "Lock Cohorting: A General Technique for Designing NUMA Locks", ACM, PPoPP'12, Jul. 25-19, 2012, pp. 1-10.

Nuno Diegues, et al., "Seer: Probabilistic Scheduling for Hardware Transactional Memory", ACM, SPAA'15, Jun. 13-15, 2015, pp. 1-10.

Jean-Pierre Lozi, et al., "Remote Core Locking: Migrating Critical-Section Execution to Improve the Performance of Multithreaded Applications", 2012 USENIX Annual Technical Conference (USENIX ATC 12), 2012, pp. 65-76.

\* cited by examiner

ADAPTIVE TECHNIQUES FOR IMPROVING PERFORMANCE OF HARDWARE TRANSACTIONS ON MULTI-SOCKET MACHINES

This application claims benefit of priority of U.S. Provisional Application Ser. No. 62/216,994 titled "Adaptive Techniques for Improving Performance of Hardware Transactions on Multi-Socket Machines" filed Sep. 10, 2015, the content of which is incorporated by reference herein in its entirety.

BACKGROUND

Field of the Disclosure

This disclosure relates generally to concurrent programming, and more particularly to systems and methods for improving performance for hardware transactions on multi-socket machines.

Description of the Related Art

Hardware transactional memory (HTM) supports a model of concurrent programming where the programmer specifies which code blocks should be atomic, but not how that atomicity is achieved. Some form of HTM is currently supported by processors from Intel Corporation (hereinafter "Intel") and IBM Corporation (hereinafter "IBM"). Transactional programming models are attractive because they promise simpler code structure and better concurrency compared to traditional lock-based synchronization.

An atomic code block is called a transaction. HTM executes such transactions speculatively. For example, with HTM, if an attempt to execute a transaction commits, that atomic code block appears to have executed instantaneously and in its entirety, while if it aborts that code has no effect, and control passes to an abort handler. A condition code typically indicates why the transaction failed. One limitation of today's HTM systems is that, with some exceptions, they are best-effort implementations. In other words, HTM implementations typically make no guarantee that any transaction, however small or simple, will ever commit.

The introduction of hardware transactional memory (HTM) into commercial processors opened a door for designing and implementing scalable synchronization mechanisms. One example for such an efficient mechanism is transactional lock elision (TLE), where lock-based critical sections are executed concurrently using hardware transactions. So far, however, the effectiveness of TLE and other HTM-based mechanisms has been assessed primarily on small, single-socket machines.

SUMMARY

When executing multithreaded applications on multi-socket machines, one or more locks may be utilized, via hardware transactional memory, to protect shared resources. According to some embodiments, each lock may be augmented with a socket scheduling mode indicating whether or not a thread may acquire the lock when executing on a particular socket of the multi-socket machine. Thus, a thread executing on a particular socket may only be able to acquire a lock if the current socket scheduling mode for that lock indicates that a thread is allowed to acquire the lock, or in general execute a critical section, when executing on that particular socket. For example, in a system including two sockets, an example socket scheduling mode may have three possible values. According to one example embodiment, two of the modes may be used to indicate that threads may acquire the lock only if they are running on a particular socket of the machine, while the third mode may allow a thread to acquire the lock regardless of the socket on which the thread is executing. Threads that try to acquire the lock while running on the wrong socket (i.e., a socket not indicated by the lock's current mode) may block until the lock's mode allows them to acquire the lock, according to some embodiments.

In some embodiments, time sharing may allow threads on multiple sockets to run without starving. During execution, different socket scheduling modes may be used alternately in order to avoid starving of individual threads. For example, in one embodiment, execution may be divided into fixed time quanta (e.g., 10 milliseconds) and a lock may spend some fraction of each time quantum executing in one socket scheduling mode (such as its fastest mode), and the remaining time executing in its another socket scheduling mode (such as its second fastest mode).

In order to determine the appropriate socket scheduling mode to use for various applications and/or workloads, in some embodiments, a profiling session may be used to analyze a running workload and determine one or more socket scheduling modes to be used for that particular workload. For example, a profiling session may iterate over all possible socket scheduling modes, set all locks to the current mode being analyzed, and measure the total number of times critical sections protected by a lock were executed for a period of time. Additionally, after a profiling session is complete, each lock may be set to the mode for which it performed best.

Figure 1:
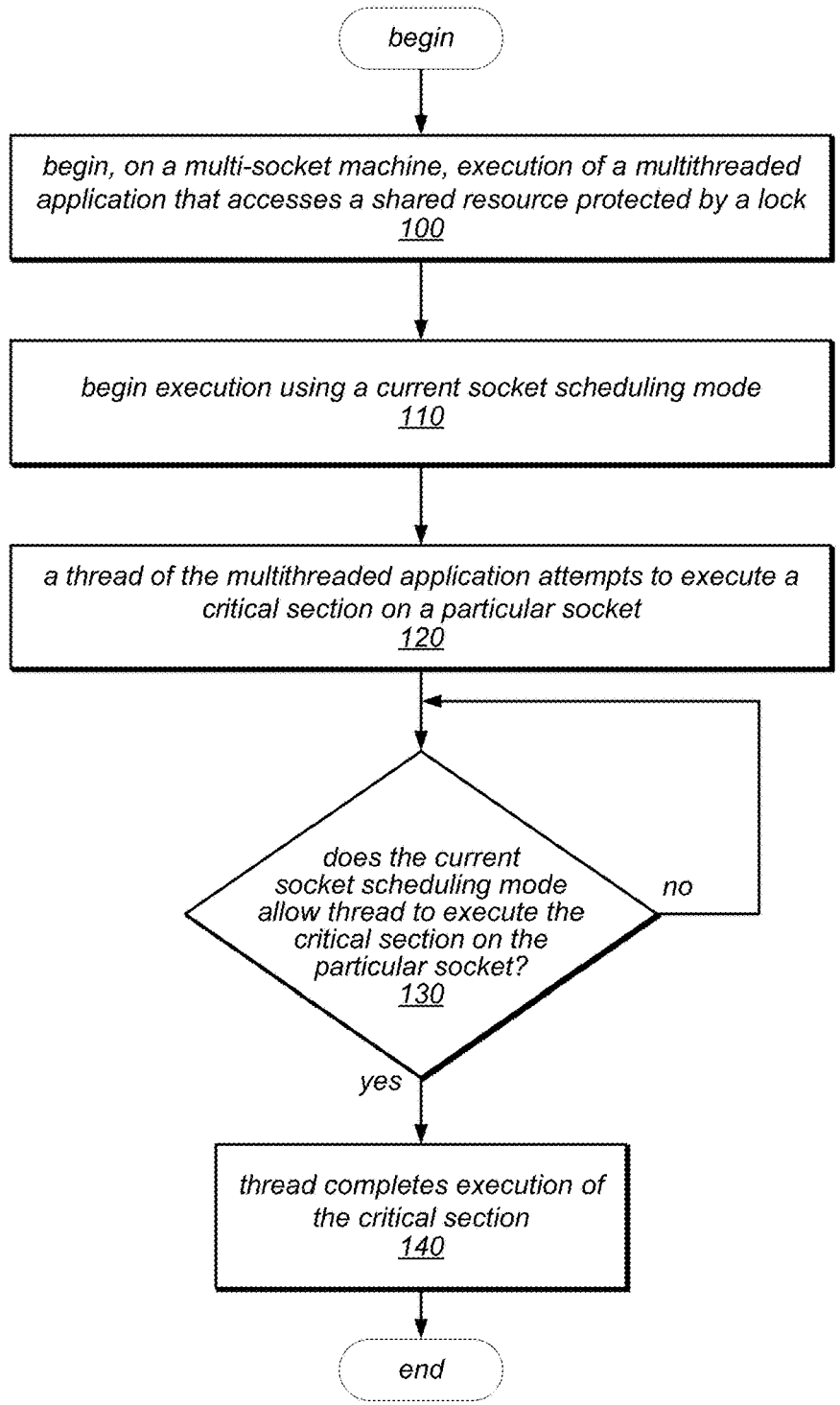
FIG. 1 is a flow diagram illustrating one embodiment of a method for improving the performance of hardware transactions on multi-socket machines.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, the introduction of hardware transactional memory (HTM) into commercial processors opened a door for designing and implementing scalable synchronization mechanisms. One example for such an efficient mechanism is transactional lock elision (TLE), where lock-based critical sections are executed concurrently using hardware transactions. So far, however, the effectiveness of TLE and other HTM-based mechanisms has been assessed primarily on small, single-socket machines.

In some embodiments, the mechanisms and techniques described herein may reduce, minimize, and/or overcome so-called NUMA (non-uniform memory access) effects and may improve and/or optimize the performance of hardware transactions on multi-socket machines. Using transactional lock elision (TLE) as an example, it has been shown that hardware transactions running on a multi-socket system may scale almost linearly as long as all threads run on the same socket, but a single thread running on a different socket can wreck performance. As described herein, adaptively throttling threads as necessary to optimize system performance may reduce, minimize and/or overcome this problem. In some embodiments, throttling decisions may be implemented on a per-lock basis and different throttle solutions may be used for different locks during a single execution or for a single workload. In some embodiments, the methods, mechanisms and/or techniques described herein may perform well even for sophisticated workloads where the best decision may be different for each lock. While described mainly in terms of systems utilizing transactional lock elision (TLE), the mechanisms and techniques described herein may be applicable to virtually any multi-threaded/multi-process software products that run on multi-socket systems with Hardware Transactional Memory (HTM), according to various embodiments.

Introduction

To perform well on modern multiprocessor systems, applications may have to exploit the increasing core count on these systems by executing operations concurrently on different cores without introducing too much overhead in synchronizing these operations. Recent systems have introduced hardware transactional memory (HTM) to support efficient synchronization. However, until recently, HTM has been available only on relatively small single-socket multi-core systems. As described herein, the behavior of HTM on a large multi-socket machine may differ from the behavior of the smaller systems in ways that present challenges for scaling the performance on the larger machine.

Figure 8:
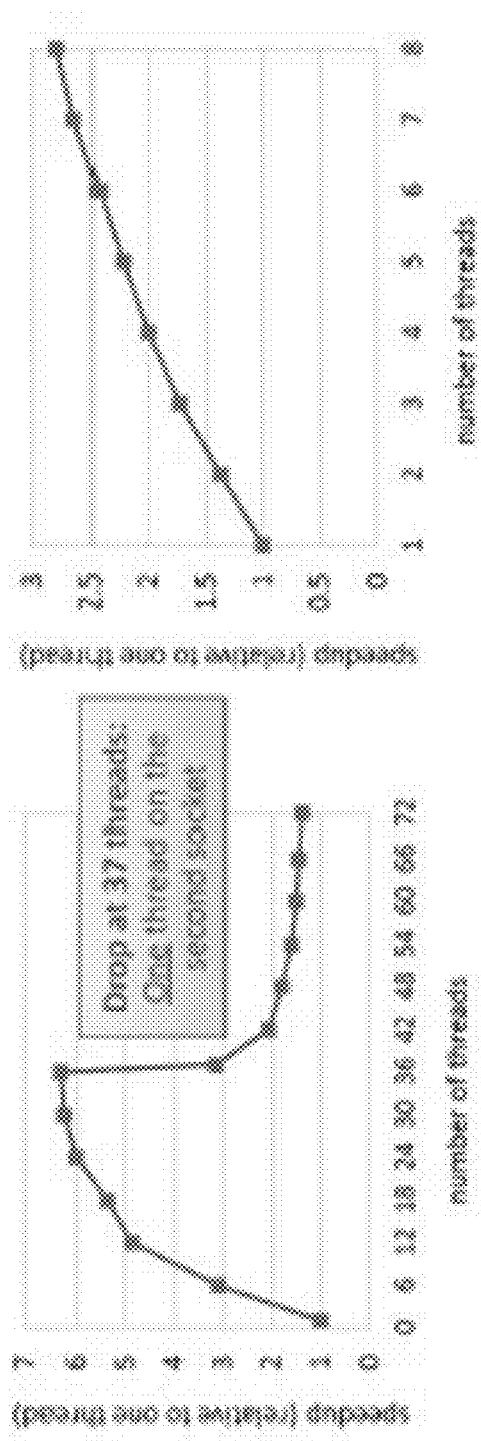
FIGS. 8-18 illustrate the performance of various benchmarks when different techniques for performing atomic transactions and/or for improving hardware transactions are implemented, according to various embodiments.

For example, consider the graph in FIG. 8, which shows the speedup over a single-thread execution of a microbenchmark in which items are continually inserted and deleted in an AVL tree (a kind of balanced binary search tree). More specifically, FIG. 8 illustrates results for an example TLE AVL tree (initialized with approximately 1024 random keys) with 50% insertion and 50% deletion workload on large HTM system (left), and small HTM system (right). According to this example, operations on the tree are protected by a single lock, to which transactional lock elision (TLE), a popular technique for exploiting HTM in which lock-based critical sections are executed concurrently using hardware transactions, is applied. The example large machine has two sockets, each with 18 cores and 2 hardware threads per core, for a total of 72 threads. As can be seen in this example, performance improves until reaching 36 threads, corresponding to the number of threads on a single socket, and then drops (dramatically) as soon as any thread executes on the second socket. Performance continues to decline until the machine is fully occupied, at which point its performance is barely better than for a single thread. This drop in performance is in stark contrast to the behavior reported in previous work on smaller machines, in which the performance may continue to improve until the machine is saturated. This is shown in the right part of FIG. 8, where performance achieved on a single-socket, 4-core machine is reported, according to one example embodiment.

Note that not all benchmarks exhibit this pathology (e.g., a drop in performance, once threads are executing on multiple sockets). For example, when there are only lookup operations (i.e., no insertions and deletions), performance may scale all the way to 72 threads (i.e., the full capacity of the machine). A variety of ways to use HTM effectively on the multi-socket machine are described herein.

Dealing with NUMA

As a first attempt at dealing with NUMA effects, one might try restricting concurrency. For instance, one might allow only a small number of threads to run on the second socket. However, as FIG. 8 shows, even a single thread running on the second socket may be sufficient to cripple performance. Alternatively, one might force threads on the second socket to backoff before retrying an aborted transaction. However, performance may improve only when the backoff period is so long that the second socket is almost completely starved. Thus, one possible solution (e.g., to deal with NUMA effects) is to starve all but one socket. Starving all but one socket may prevent performance degradation beyond 36 threads, but may also yield poor performance for workloads that scale on two sockets.

Thus, in some embodiments, an algorithm may be utilized for profiling a running workload to determine whether it is appropriate to allow threads to run on only one socket, or to let them run unrestricted. In general, a transactional program may be profiled periodically in order to determine on what sockets (and for how long) threads should be allowed to run. For example, based on a profiling session, it may be determined that threads may run on all sockets all the time, alternate between individual sockets (e.g., for 10 ms each), or alternate between sets of sockets (possibly selected randomly). The selected mode of execution (i.e., what sockets thread may be allowed to run on—and for how long) may be used until another profiling session begins. For simplicity, the algorithm is described herein in terms of a two socket machine. However, there are natural extensions to larger socket counts and the methods, mechanism and/or techniques described herein may apply to systems with virtually any number of sockets. For example, the algorithm may be implemented on top of TLE in a system with multiple locks protecting shared resources. According to some embodiments, each lock may be augmented with a mode indicating whether or not a thread may acquire the lock, or otherwise run a hardware transaction, when executing on a particular socket. Note however, that the use of locks and/or lock modes merely represent specific example embodiments of the methods, techniques and/or mechanisms described herein and, in some embodiments the methods, techniques and/or mechanisms described herein may be applied to systems that do not utilize locks or lock modes (but may utilize other socket scheduling modes). In general, the terms "lock mode" and "socket scheduling mode" may be used interchangeably herein, without limiting the methods, techniques and/or mechanisms described herein to any particular example or embodiment.

As noted above, the algorithm is described herein in terms of a two socket machine. For example, in a system including two sockets, a socket scheduling mode might have three possible values: zero, one or two. According to one example embodiment, modes zero and one may allow threads to acquire the lock only if they are running on socket zero, or socket one, respectively, while mode two may allow threads on both sockets to acquire the lock. Put another way, mode two may allow a thread to acquire the lock regardless of the particular socket on which the thread is executing. Threads that try to acquire the lock while running on the wrong socket (i.e., a socket not indicated by the lock's current mode) may block until the lock's mode allows them to acquire the lock, according to some embodiments. In general, the number of possible modes per lock may vary from embodiment to embodiment. For instance, in one embodiment, each lock may be able to be in any of n+1 modes, where n equals the number of sockets on which a thread may execute. For instance, in the example above, there may be three possible modes (e.g., mode zero, mode one and mode two) for a system including two sockets. Individual modes may indicate that threads may acquire the lock when running on one or more sockets. For instance, in the example above, modes zero and one each indicate that threads may acquire the lock when executing on a single socket, either socket zero or socket one, respectively, while mode two may indicate that threads may acquire the lock when executing on socket one or socket two. The exact mapping of modes to sockets may vary from embodiment to embodiment.

FIG. 1 is a flow diagram illustrating one embodiment of a method for improving the performance of hardware transactions on multi-socket machines. As illustrated in block 100, execution of a multithreaded application that accesses a shared resource may begin on a multi-socket machine. The shared resource may be protected by a lock. For example, a system may include two sockets and a multithreaded application may utilize one or more locks protecting access to one or more shared memory locations, according to some embodiments.

Execution may begin using a current socket scheduling mode, as in block 110. For example, as described above, in some embodiments, socket scheduling modes may be associated with locks (e.g., protecting shared resources), and may thus be referred to as lock modes. Locks may utilize one or more socket scheduling modes (e.g., lock modes) indicating whether or not a thread may acquire the lock while executing on particular sockets. While executing according to the current socket scheduling mode and on a particular socket, a thread of the multithreaded application may attempt to execute a critical section, such as by attempting to acquire the lock or otherwise attempting to run a hardware transaction, as illustrated by block 120. If the current socket scheduling mode allows the thread to execute the critical section on the particular socket, as indicated by the positive output of decision block 130, the thread may complete execution of the critical section, as illustrated in block 140. For instance, in one TLE-based example using the two-socket example system described above, a thread executing on socket zero may attempt to acquire the lock associated with a shared resource when attempting to execute a critical section and may be allowed to acquire the lock (and/or run a hardware transaction associated with the shared resource), based on a current lock mode (e.g., when the lock is currently in lock mode zero).

If, however, the particular current socket scheduling mode does not allow the thread to acquire the lock, or run a hardware transaction, when executing on the particular socket, as indicated by the negative output of decision block 130, the thread may block until it is able to execute the critical section, such as when the socket scheduling mode is subsequently changed, according to some embodiments. Continuing the two-socket example from above, a thread executing on socket one may be not allowed to acquire the lock if the lock is currently in lock mode zero, but may subsequently be allowed to acquire the lock if the lock changes to use lock mode one (or lock mode two), according to some embodiments.

Figure 2A:
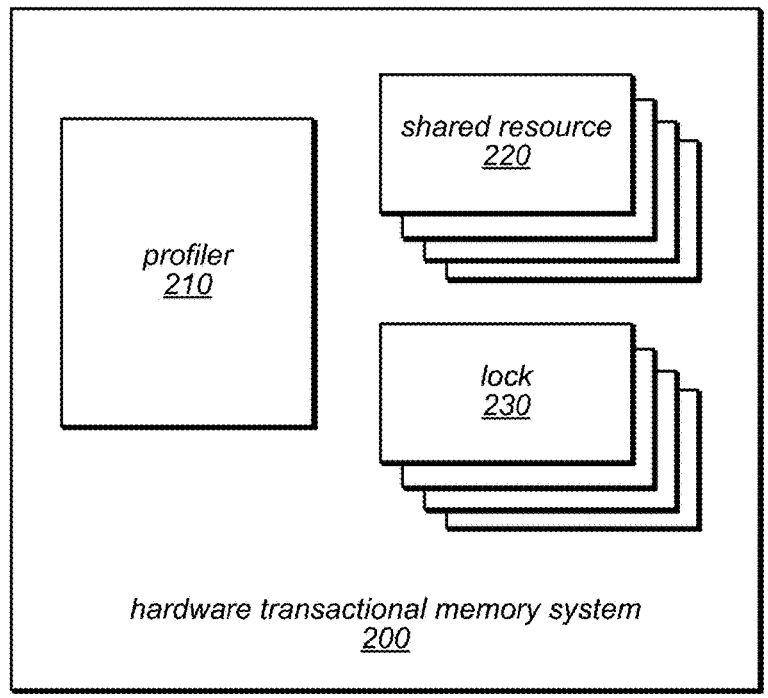
FIG. 2A is a logical block diagram illustrating a hardware transactional memory system configured to implement Adaptive Techniques for Improving Performance of Hardware Transactions on Multi-Socket Machines, according to one embodiment.

FIG. 2A is a logical block diagram illustrating a hardware transactional memory system configured to implement any of various methods, techniques and/or mechanisms of Adaptive Techniques for Improving Performance of Hardware Transactions on Multi-Socket Machines, as described herein according to various embodiments. As described above, in some embodiments, a system configured to implement hardware transactions (i.e., on a multi-socket machine) may include a hardware transactional memory system configured to implement any of various techniques for improving performance of hardware transactions on multi-socket machines. For example, a hardware transactional memory system 200 may include one or more locks 230 protecting one or more shared resources 220. Lock 230 may be implemented in hardware, software or using a combination of both hardware and software, according to various embodiments. Shared resource 220 may represent any of various types of shared resources, such as memory locations, interfaces, devices, etc. Hardware transactional memory system 200 may include a profiler 210 configured to profile (or test) one or more socket scheduling modes by iterating over the modes (e.g., TLE-based lock modes) and tracking, for individual thread/mode pairings, the number of lock acquisitions, the number of lock elisions, the number of critical sections executed, and/or any other statistic pertaining to transactional or non-transactional executions of critical sections (e.g., fewest number of aborts, shortest transaction execution time, etc.).

Figure 2B:
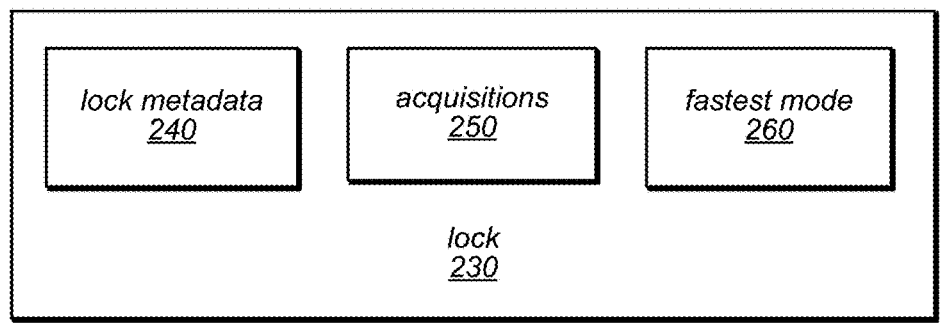
FIG. 2B is a logical block diagram illustrating one embodiment of a lock data structure suitable for use within Adaptive Techniques for Improving Performance of Hardware Transactions on Multi-Socket Machines.

As noted above, when implementing Adaptive Techniques for Improving Performance of Hardware Transactions on Multi-Socket Machines, as described herein, locks may be augmented to include a mode indication indicating whether or not a thread may acquire the lock, or otherwise execute a critical section, when executing on a particular socket of the multi-socket machine. FIG. 2B is a logical block diagram illustrating a lock data structure according to one embodiment. As described above, a lock data structure, such as the one represented by lock 230 may include metadata configured to indicate whether the lock is held or not, such as lock metadata 240. In some embodiments, lock metadata 240 may represent any form of legacy metadata used by legacy style locks. Lock 230 may include an indication of a best lock mode, such as fastest mode 260. In some embodiments, a best socket scheduling mode may represent an individual mode which achieves better performance according to one or more performance metrics (e.g., in terms of lock acquisition, lock elision, critical section execution, etc., by threads) than other modes. Additionally, an alternate (e.g., second) mode may, according to some embodiments, represent an individual mode that achieves lower performance according to one or more performance metrics (e.g., in terms of lock acquisition, lock elision, critical section execution, etc., by threads) than the best, or fastest, mode. In some embodiments, fastest mode 260 may be determined according to the data collected during profiling a particular application or workload, as will be described in more detail below. Thus, lock 230 may include acquisitions 250 configured to store information (e.g., gathered during a profiling session) regarding the number of times lock 230 was acquired and/or elided by particular threads for particular modes (e.g., during the profiling session). For instance, in one embodiment, acquisitions 250 may include an array data structure, such as "long acquistions[ ][ ]", configured to store the number of times the lock has been acquired and/or elided for each thread/mode pairing during a particular profiling session. Note that while described herein mainly in terms of lock acquisitions, in some embodiments, lock elisions and/or other statistics may be used in addition to, or in place of, lock acquisitions. For instance, in a system implementing TLE, locks may be elided instead of, or in addition to, being acquired. Thus, references herein to lock acquisitions (including within example pseudocode) may also refer to lock elisions and/or to other statistics pertaining to executions (whether transactional or not) of critical sections, such as a number of transaction aborts, transaction execution time, etc., according to various embodiments.

Figure 3:
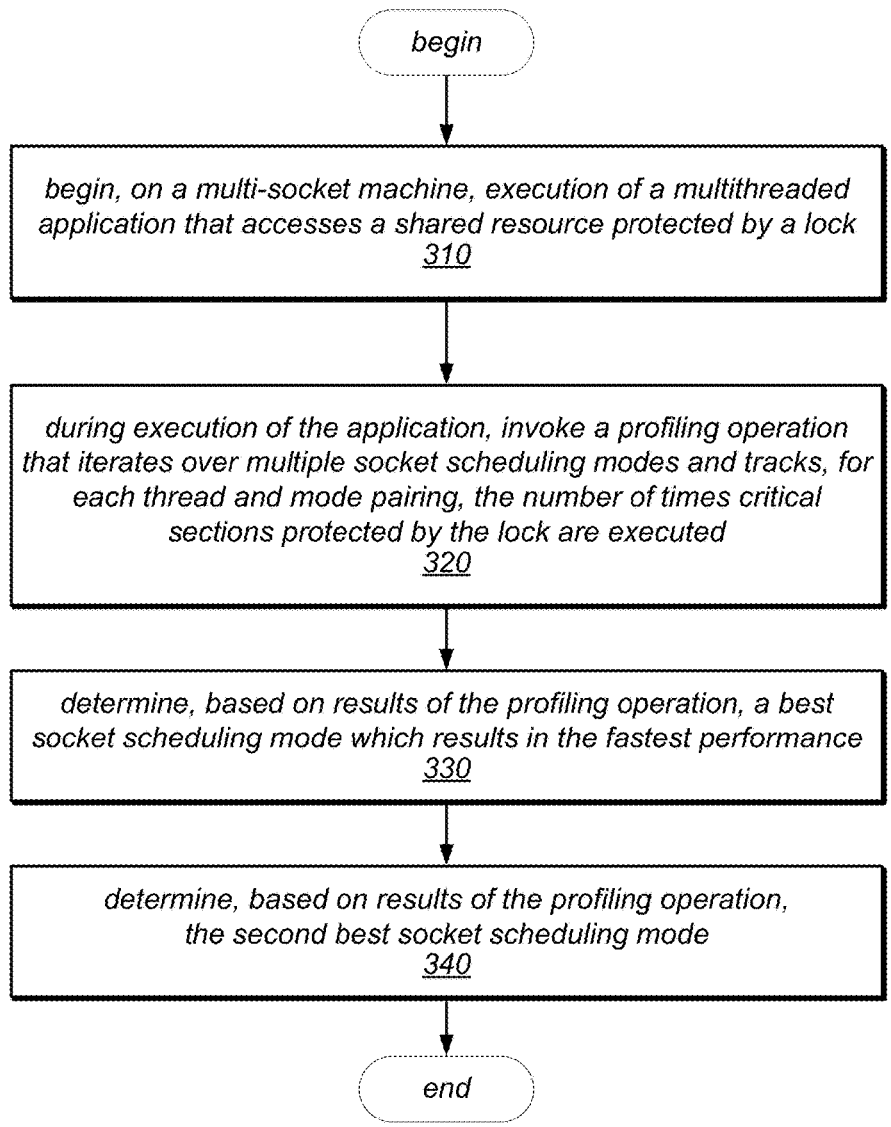
FIG. 3 is a flow diagram illustrating one embodiment of a method for improving the performance of hardware transactions on multi-socket machines.

As noted above, in some embodiments a profiling session may be used to analyze a running workload and determine one or more socket scheduling modes according to which locks (or, in general, execution of critical sections) should be used for that particular workload. At a high level, a profiling session may iterate over all possible lock modes (e.g., three lock modes in the above example of a two socket system), set all locks to the current mode being analyzed, and measure the total number of lock acquisitions and/or elisions (over all locks) for a period of time (e.g., a short, fixed, period of time). Additionally, after a profiling session is complete, each lock may be set to the mode for which it performed best. FIG. 3 is a flow diagram illustrating one embodiment of a method for improving the performance of hardware transactions on multi-socket machines.

As in block 310, a multithreaded application that accesses a shared resource protected by a lock may be executed on a multi-socket machine. During execution of the multi-threaded application, a profiling operation may be invoked that iterates over multiple socket scheduling modes (e.g., over multiple TLE-based lock modes) and that tracks, for each thread/mode pairing, statistics pertaining to execution attempts of critical sections, such as the number of times critical sections protected by the lock are executed, lock acquisitions, lock elisions, etc. In some embodiments, the tracked data may be stored within a data structure accessible during subsequent, non-profiling, execution of the multi-thread application. For example, in one embodiment the number of lock acquisitions and/or elisions may be stored and/or maintained within a lock data structure, such as within acquisitions 250 of lock 230. As illustrated in block 330, it may be determined, based on results of the profiling operation, which socket scheduling mode results in the fastest performance (e.g., the best mode for the lock). For example, in one embodiment, after the profiling session has completed recording data, the data in acquisitions 250 may be used to determine an individual lock mode (e.g., the best performing, or fastest, lock mode) and an indication of the determined lock mode may be stored in the lock data structure, such as in fastest mode 260 of lock 230.

In some embodiments, a best socket scheduling mode may represent a particular socket scheduling mode exhibiting the fastest performance on the multi-socket machine when executing the multithreaded application. In other embodiments, the best mode may be best on other characteristics of execution, such as based on lock execution. Additionally, it may also be determined, based on the profiling operation, a second best socket scheduling mode, as in block 340. According to some embodiments, the second best mode may represent the mode exhibiting the second fastest performance (e.g., as compared to the best mode) on the multi-socket machine when executing the multithreaded application. For example, in some embodiments, different lock modes may be considered a best lock mode or a second best lock mode when different multi-threaded applications may be executing. In other words, no single socket scheduling mode may be considered the best (or second best) mode for all applications and/or workloads.

Figure 4:
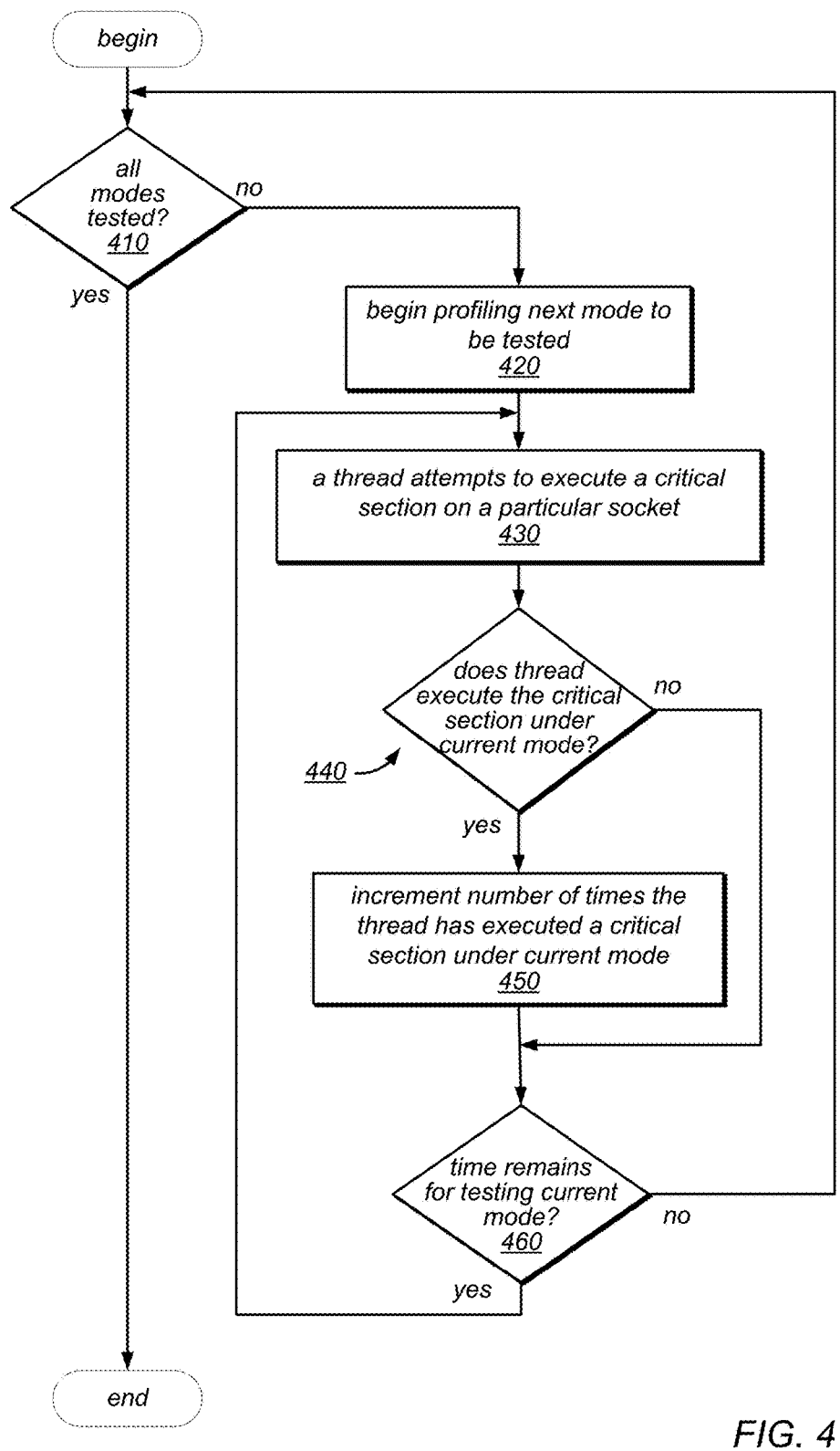
FIG. 4 is a flow diagram illustrating one embodiment of a method for improving the performance of hardware transactions on multi-socket machines.

FIG. 4 is a flow diagram illustrating one embodiment of a method for utilizing profiling to improve the performance of hardware transactions on multi-socket machines. While executing a multi-threaded application on a multi-socket machine, a profiling session may be started, as described above. If all socket scheduling modes have not yet been tested during the profiling session, as indicated by the negative output of decision block 410, the next socket scheduling mode to be tested may be profiled, as in block 420. When a thread attempts to execute a critical section on a particular socket, as in block 430, if the thread does execute the critical section under the current socket scheduling mode (e.g., the mode currently being tested/profiled), as indicated by the positive output of decision block 440, the number of times the thread has executed a critical section under the current lock mode may be incremented, as in block 450. If, however, the thread is unable to execute the critical section, such as because the current socket scheduling mode being tested doesn't allow the thread to execute the critical section when executing on a particular socket, as indicated by the negative output of decision block 440, the number of times the thread has executed a critical section under the current lock mode may not be incremented. If time remains for testing the current socket scheduling mode, as indicated by the positive output of decision block 460, the profiling session may continue to test the current mode. If, however, the time allocated for testing the current socket scheduling mode has expired, as indicated by the negative output of decision block 460, the profiling session may again determine whether all socket scheduling modes have been tested/profiled and may begin testing another socket scheduling mode, if not all modes have been tested.

The abstract data type (ADT) for TLE traditionally provides two operations: LockAcquire and LockRelease, each of which takes a lock as an argument. The ADT for the example algorithm outlined below, TLEStarve, provides operations: LockAcquire, LockRelease and ProfileAndThrottle. Thus, in some embodiments, a new primitive, called ProfileAndThrottle, may be used to start (and/or perform) a profiling session.

In some embodiments, the ProfileAndThrottle primitive may allow a programmer to manually trigger profiling, optimizing performance with minimal effort. However, the success of profiling may, in some embodiments, depend on the workload being (at least somewhat) homogeneous. Thus, a programmer who knows that the program is about to begin a homogeneous workload may trigger a profiling session utilizing the ProfileAndThrottle primitive. However, there are other ways that ProfileAndThrottle could be used, according to various embodiments. For example, if a programmer knows that a workload consists of one or more relatively long, homogeneous phases, but who has no compile-time knowledge of when those phases begin or end, may invoke ProfileAndThrottle periodically and therefore trigger one or more profiling session in order to determine which lock modes may work best for particular workloads being performed, according to some embodiments. In some embodiments, the ProfileAndThrottle primitive may be triggered periodically and/or automatically (i.e., without programmer intervention).

The following example (C-like) pseudo-code illustrates one possible example for implementing profiling and lock modes utilizing LockAcquire, ProfileAndThrottle, and their subroutines. In the example illustrated by the pseudo-code below, the LockRelease routine simply calls the lock release procedure provided by the underlying TLE implementation.

```
// TLEStarve example pseudocode
type Lock {
    lock_t lockData; // original lock metadata
    // fields added for ProfileAndThrottle
    long acquisitions[ ] [ ];
        // acquisitions[i] [m] = number of lock
        // acquisitions and elisions for thread i and mode m
    long fastestMode;
};
Lock ** locksToProfile;
    // set of locks currently being profiled
long profileStartTime = 0;
    // lock guarding metadata for all instances of Lock
    // 0: unlocked and not currently profiling
    // >0: unlocked and currently profiling
    // −1 locked (and not currently profiling)
int getMode(Lock * lock) {
    long startTime = profileStartTime;
    long now = getCurrentTime( );
    int mode = (now − startTime) / PROFILE_MODE_TIME;
    if (mode < NUM_MODES) {      // if still profiling
        return mode;
    } else {
        if (startTime > 0) {
            // if the best mode for each lock has not been
determined, try to lock profileStartTime
            if (CAS(&profileStartTime, startTime, −1)) {
                computeBestLockModes( );
                profileStartTime = 0;      // unlock
            }
        }
        return lock->fastestMode;
    }
}
void computeBestLockModes( ) {
    for each lock in locksToProfile {
    // compute fastest mode for lock
    long acqs[ ];
    for each mode m, set acqs[m] = sum over all threads j of
lock->acquisitions[j] [m];
    lock->fastestMode = index of largest element of acqs
    }
}
int LockAcquire(Lock * lock) {
    while (true) {
        // check if we are allowed to acquire the lock
        int mode = getMode(lock);
```

```
        if (mode == getSocket( ) | | mode == NUM_MODES-1) {
            ++lock->acquisitions[getTid( )] [mode];
            return LockAcquireTLE(lock);
        }
    }
}
void ProfileAndThrottle(Lock ** locks) {
    // try to lock priofileStartTime
    if (CAS(&profileStartTime, 0, −1) {
        for each lock in locks {
            set all entries of lock->acquisitions to 0
        }
        locksToProfile = locks;
        profileStartTime = getCurrentTime( );      // unlock
    }
}
```

As illustrated in the above pseudo-code, a Lock type may include metadata of the original (e.g., traditional) lock implementation (lockData), the fastest mode as determined by the last profiling session (fastestMode), and an acquisitions array, which may be used for profiling. The acquisitions array may store, for each thread and mode (e.g., for all thread/mode pairs), the number of times the lock was acquired and/or elided by that thread, in that mode, since the last profiling session began. Note that, technically, each entry of the acquisitions array may represent an upper bound on the number of lock acquisitions and/or elisions by a given thread in a given mode since, the entries of the array may be reset (e.g., in preparation for a new profiling session) non-atomically, just before a profiling session begins. Consequently, some entries may be incremented after being reset (e.g., set to zero), but before the new profiling session starts. However, any error in these array entries may impact throttling decisions, but not correctness. Data stored/maintained in the acquisitions array may be used to decide a best mode (e.g., which mode is fastest), for each lock. The example implementation above includes two shared variables: locksToProfile, which is an array of pointers to Locks, and profileStartTime, which is a lock whose value is positive precisely when a profiling session is in progress. As illustrated in the above pseudo-code, when profileStartTime is locked, it contains −1, and when unlocked, it contains either zero, or the start time of the last profiling session, according to one example implementation.

The example implementation of ProfileAndThrottle, illustrated above, takes an array, locks, of pointers to the locks that should be profiled, as its argument. ProfileAndThrottle begins by attempting to lock profileStartTime, such as by using a compare-and-swap (CAS) operation. If this CAS fails, a profiling session is already in progress. Otherwise, the acquisitions arrays of all locks in the locks array are reset to contain all zeros, locksToProfile is set to locks (so information about which locks are being profiled can be accessed elsewhere in the code), and profileStartTime is set to the current time. This has the effect of starting a profiling session.

The particular variables, as well as the particular manner in which they are used in the example pseudo-code above represents mere one possible implementation, according to one embodiment, of the methods, mechanisms and techniques described herein for implementing Adaptive Techniques for Improving Performance of Hardware Transactions on Multi-Socket Machines. According to other embodiments, the methods, mechanisms and/or techniques described herein may be implemented using other processes, functions, variables, data structures, etc.

The example LockAcquire in the pseudo-code above takes a pointer to a Lock as its argument. LockAcquire may then invoke a subroutine called getMode to compute the lock's current mode, and determine which socket the current thread is running on. LockAcquire further checks whether the current mode permits the thread to acquire the lock. If so, the appropriate entry in the acquisitions array may be incremented and lock acquisition procedure provided by the underlying TLE implementation (e.g., LockAcquireTLE), may be invoked. Otherwise, LockAcquire retries from the beginning.

The example getMode in the pseudo-code above begins by getting the time when the last profiling session began (startTime), and recording the current time. It then computes how many lock modes have been profiled since startTime, and uses this information to determine whether the profiling session that began at startTime is ongoing. If the profiling session that began at startTime is ongoing, the current mode may be returned, according to some embodiments.

In some embodiments, profiling is performed during live execution of an application and/or workload rather than during a test execution. Thus, to make use of the results collected during profiling, once the profiling session which began at startTime is finished, some thread may need to compute the best mode for each lock, such as by invoking a subroutine called computeBestLockModes, according to some embodiments. The example getMode above reserves the right to invoke computeBestLockModes by locking profileStartTime, before invoking computeBestLockModes. In some embodiments, computeBestLockModes may only need to be invoked once each time a profiling session finishes. Therefore, computeBestLockModes, or another function configured to perform similar functionality, may be configured to ensure that it is only executed once. For instance, in the example pseudo-code above, before getMode locks profileStartTime and invokes computeBestLockModes, it verifies that startTime is greater than zero. If not, then another thread may have already invoked computeBestLockModes and set profileStartTime to zero before it was read by this invocation of getMode.

Fairness

Figure 5:
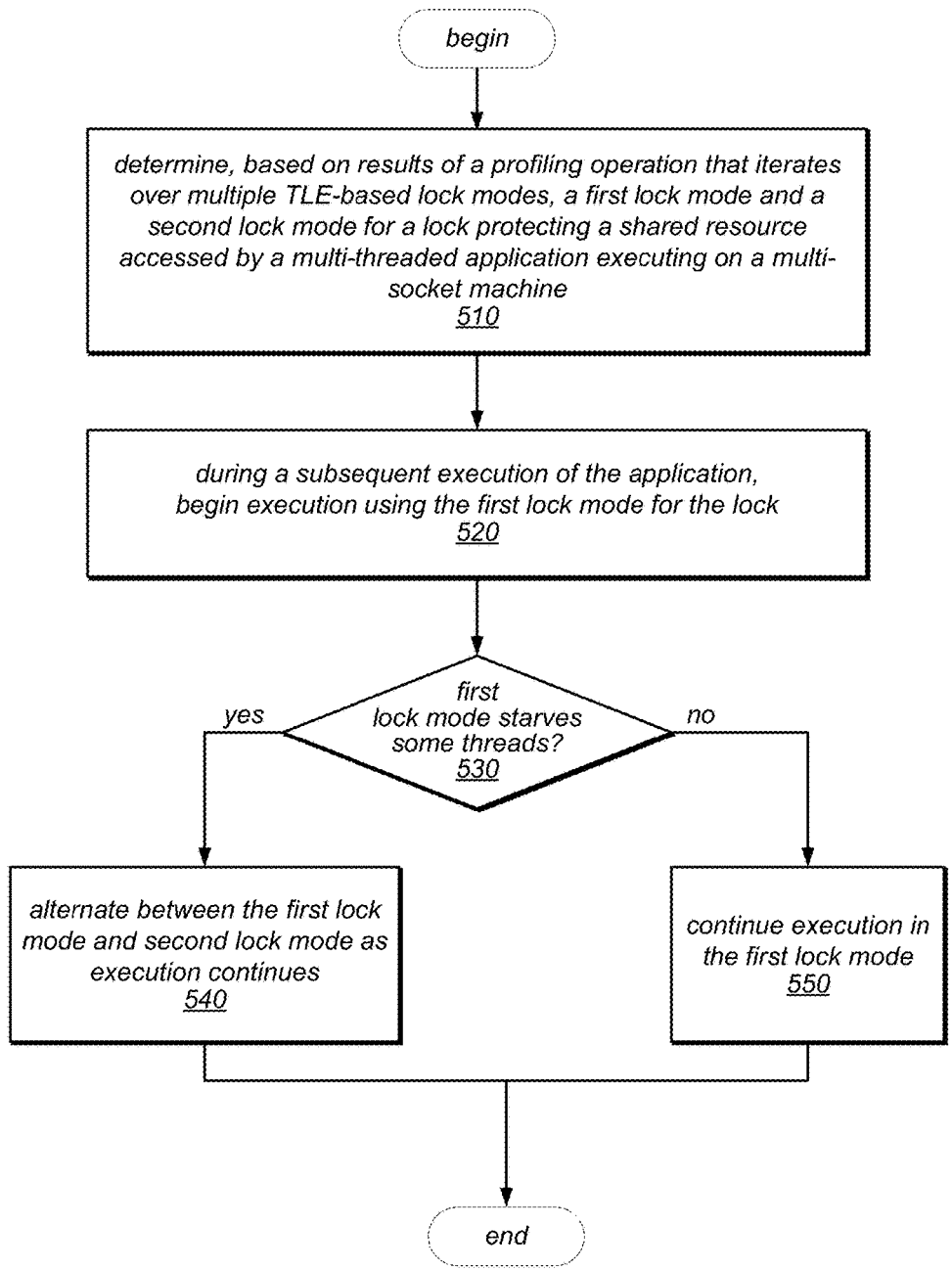
FIG. 5 is a flow diagram illustrating one embodiment of a method for improving the performance of hardware transactions on multi-socket machines.

While starving a socket may be acceptable in certain scenarios, for example, when all threads simply retrieve jobs from a work queue and perform them (in this case, blocking threads on the second socket may not impede the progress of threads on the first socket, and there is no work that can be done only by threads on the second socket), the fact that sockets may be starved entirely may be considered, in some embodiments, a downside of particular implementations of TLEStarve. Thus, in some embodiments, it may be desirable to provide some form of fairness, so that no socket is starved (e.g., threads executing on every socket are allowed to make progress). FIG. 5 is a flow diagram illustrating one embodiment of a method for ensuring fairness between sockets while improving the performance of hardware transactions on multi-socket machines.

As illustrated in block 510, according to one TLE-based example embodiment, a first lock mode and one or more second lock mode(s) may be determined for a lock protecting a shared resource accessed by a multithreaded application executing on a multi-socket machine, such as based on results of a profiling operation iterating over multiple lock modes (e.g., multiple TLE-based lock modes). In some embodiments, the first lock mode may represent a best (or fastest) lock mode while the second lock mode may represent a second best (or second fastest) lock mode, as described above. During a subsequent execution of the application, execution may begin using the first lock mode for the lock, as in block 520. If, as indicated by the negative output of decision block 530, the first lock mode does not starve some threads, execution using the first lock mode may continue, as in block 550. If, however, the first lock mode starves some thread(s), as indicated by the positive output of decision block 530, execution may continue while alternating between the first lock mode and the second lock mode, as in block 540. In some embodiments, the amount of time spent under each lock mode may vary according to information determined during a profiling session.

While described herein in terms of a first mode and a second mode, in some embodiments, more than two modes may be used (e.g., alternately) during execution. For example, on a 4-socket machine, execution may alternate among three different lock modes, a first corresponding to socket 0, a second corresponding to sockets 1 and 3, and a third corresponding to all sockets. In some embodiments, a single first mode and multiple secondary modes may be used, while in other embodiments multiple modes may be used alternately without determining or designating a particular first or best mode. In general, virtually any number of socket scheduling modes (e.g., lock modes) may be used during execution, according to various embodiments.

Figure 6:
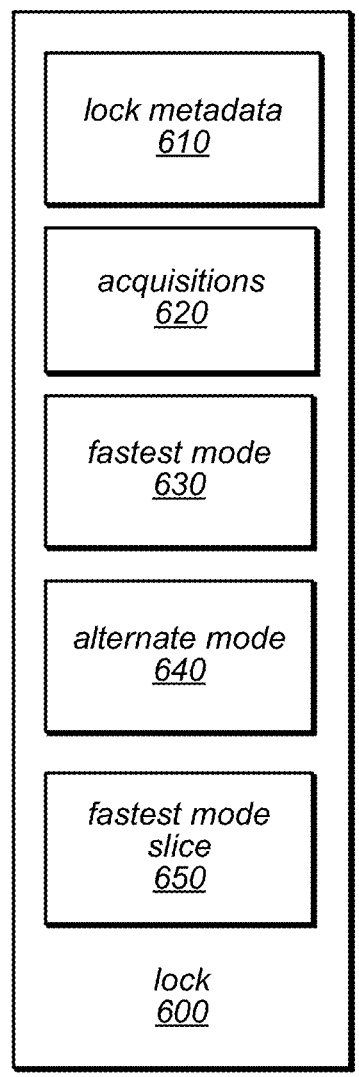
FIG. 6 is a logical block diagram illustrating a lock data structure according to one embodiment.

In some embodiments time sharing may be introduced, such as to allow threads on multiple socket to run (e.g., make progress). Recall that, in the example TLEStarve described above, each lock stores the mode wherein it performs best. In some embodiments, a new algorithm, TLEShare, may be utilized in which each lock also stores its second best mode. Additionally, in some embodiments, a profiling session (e.g., such as within the example TLEShare algorithm) may also be used to determine an amount of time for different socket scheduling modes. Conceptually, the execution may be divided into fixed time quanta (e.g., 10 milliseconds) and in each time quantum, individual locks may spend some fraction of the quantum executing in fastest mode (which may vary from lock to lock), and may spend the remaining time (e.g., of the current quantum) executing in a second fastest mode (which may also vary from lock to lock). In some embodiments, the profiling process (e.g., such as in the example TLEShare algorithm) may determine (or may be used to determine) a ratio of time to be spent in different socket scheduling modes. For example, in one embodiment, the profile process may determine a ratio indicating relative amounts of time to be spent in the best (e.g., fastest) socket scheduling mode and in the alternate (e.g., second fastest) socket scheduling mode. Thus, in one example, TLEShare (or similar algorithm) may determine and/or store information (e.g., such as ratio) indicating relative amounts of times according to which the best socket scheduling mode and the alternate socket scheduling mode may be applied alternately during subsequent execution (of a multithreaded application). FIG. 6 is a logical block diagram illustrating a lock data structure according to one embodiment.

As described above, a lock may be represented by a lock data structure, such as lock 600. Lock 600 may include metadata configured to indicate whether the lock is held or not, such as lock metadata 610. In some embodiments, lock metadata 610 may represent any form of legacy metadata used by legacy style locks. Additionally, lock 600 may include acquisitions 620 configured to store information regarding the number of times lock 600 has been acquired and/or elided by particular threads for particular modes. For instance, in one embodiment, acquisitions 620 may include an array data structure, such as "long acquistions[ ][ ]", configured to store the number of times the lock has been acquired and/or elided for each thread/mode pairing during a particular profiling session.

Additionally, lock 630 may include an indication of the best mode, such as fastest mode 630. Fastest mode 630 may be determined according to the data collected during profiling and stored in acquisitions 620, according to some embodiments. Lock 600 may also include an indication of an alternate (or second) mode, such as alternate mode 640. In some embodiments, alternate mode 640 may represent a second fastest lock mode for lock 600. Lock 600 may also include, in some embodiments, an indication, such as fastest mode slice 650, representing an amount of any time quantum during which to use the fastest lock mode vs the alternate lock mode. For example, in one embodiment, fastest mode slice 650 may represent a length of time, or a fractional amount, used to determine when to switch between the fastest lock mode and the alternate lock mode.

As noted above, in some embodiments, a profiling session may result in information indicating relative amounts of times according to which different socket scheduling modes (e.g., best and alternate socket scheduling modes) may be utilized alternately during subsequent execution (of a multithreaded application). The amount of time given to each of these modes may represent a trade-off between achieving fairness and ideal single-socket performance, according to some embodiments. In one embodiment, individual lock modes may be given a time slice proportional to the performance of the lock in that individual mode, such as may be determined during profiling. However, in some embodiments, proportionally allocating the time within individual quantum may result in sub-optimal performance. For example, in the update-heavy workload illustrated in FIG. 8 (e.g., when there are 36 threads on the first socket, and one thread on the second socket) the best mode may throttle one socket, while the second best mode may let both sockets run. Since the only reason to time share in this example case is to avoid starving the single thread on the second socket, it may, in some embodiments, make sense to run in the second best mode for 1/37th, or perhaps 1/36th, of the total execution time. However, since the throughput when both sockets run is approximately half of the throughput when a single socket runs, approximately 1/3rd of the execution time may be allocated to let both sockets run. Thus, in some embodiments, the time slices given to the fastest and second fastest modes may be expressed as a function of the performance of the lock in each of the modes where only a single socket can run.

Figure 15:
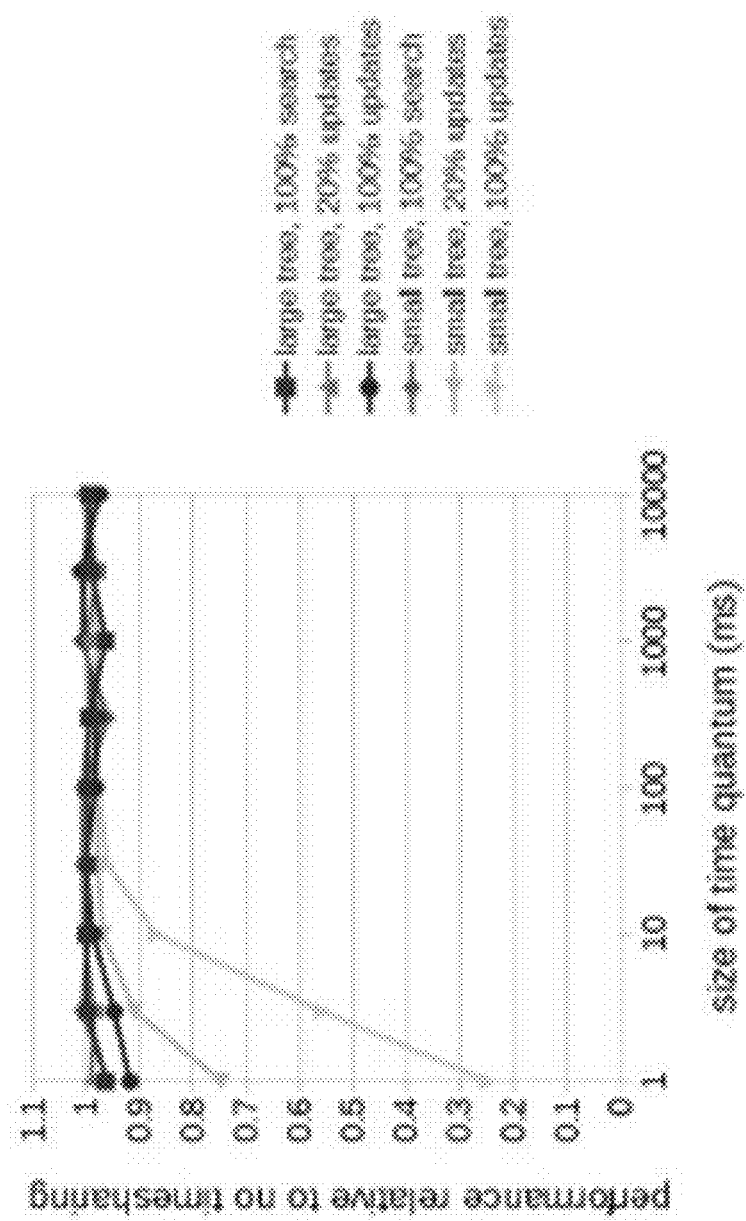

The length of a time quantum is another factor in the trade-off between achieving fairness and ideal single-socket performance. For example, shorter time quanta may promote a higher degree of fairness, but may also introduce greater overhead (i.e., as the sockets pollute each other's caches more frequently). For example, FIG. 15 illustrates, according to one example embodiment, the overhead introduced by different quantum lengths in six different example workloads. More specifically, FIG. 15 illustrates the overhead caused in six different workloads by the choice of time quantum length. All data points in FIG. 15 represent the performance of TLEShare, relative to TLEStarve, with 72 threads. These results show that there may be very little overhead for time quanta that are 30 milliseconds long, or longer, according to some embodiments.

Figure 7:
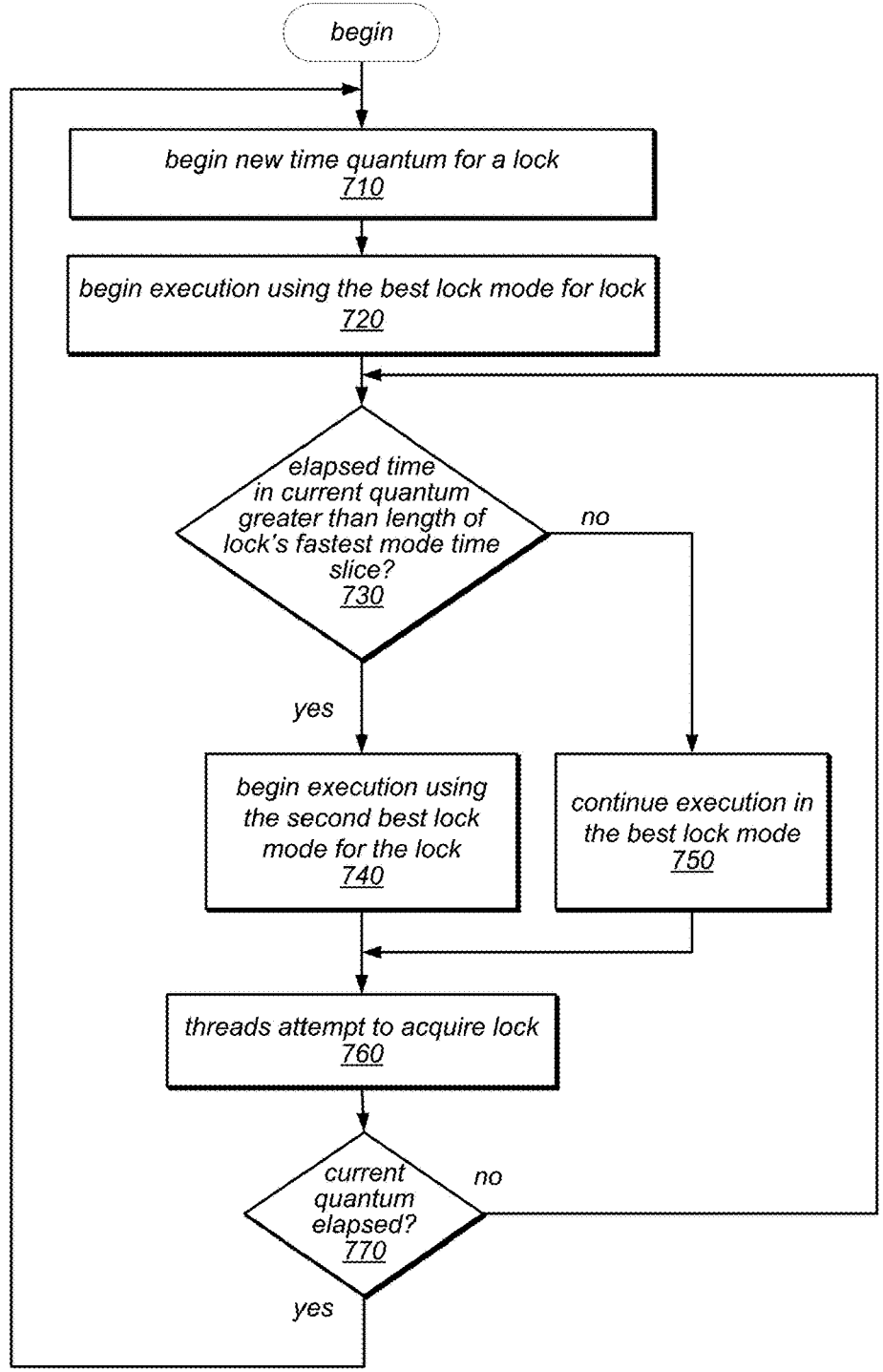
FIG. 7 is a flow diagram illustrating one embodiment of a method for improving the performance of hardware transactions on multi-socket machines.

FIG. 7 is a flow diagram illustrating one embodiment of a method for improving the performance of hardware transactions on multi-socket machines, according to one TLE-based example embodiment. When executing a multithreaded application on a multi-socket machine, a new time quantum may be started for a particular locking mode, as in block 710. An execution using the best lock mode for the lock may be started, as in block 720. During execution, if the elapsed time in the current quantum is greater than the length of the lock's fastest mode time slice, as indicated by the positive output of decision block 730, execution may then begin using the second best lock mode for the lock as illustrated by block 740. Alternatively, if the elapsed time in the current quantum is not greater than the length of the lock's fastest mode time slice, as indicated by the negative output of decision block 730, execution may continue using the best lock mode, as in block 750. Regardless of which lock mode is being used during execution during any particular part of the current quantum, threads may attempt to acquire the lock, as in block 760. As described above, a thread may or may not be allowed to acquire the lock, depending on the particular socket the thread is executing on and which lock mode is currently being used. Once the current quantum is elapsed, as indicated by the positive output of decision block 770, a new time quantum may begin as in block 710. Otherwise, while the current time quantum has not elapsed, as indicated by the negative output of decision block 770, execution will continue using the best lock mode until the elapsed time in the current quantum is greater than the lock's fastest mode time slice, at which point execution may be using the second best lock mode, according to some embodiments.

Example C like pseudo-code for a TLEShare implementation according to one embodiment, appears below.

```
// TLEShare example pseudocode
type Lock {
    lock_t lockData;      // original lock matadata
    // fields added for ProfileAndThrottle
    long acquisitions[ ] [ ];
        // acquisitions[i] [m] = number of lock
        // acquisitions and elisions for thread i and mode m
    long fastestMode;
    long alternateMode;
    long fastestModeSlice;
        // time slice out of each quantum for which
        // the lock mode should be fastestMode
};
Lock ** locksToProfile;
    // set of locks currently being profiled
long profileStartTime = 0;
    // lock guarding metadata for all instances of Lock
    // 0: unlocked and not currently profiling
    // >0: unlocked and currently profiling
    // -1 locked (and not currently profiling)
int getMode(Lock * lock) {
    long startTime = profileStartTime;
    long now = getCurrentTime( );
    int mode = (now - startTime) / PROFILE_MODE_TIME;
    if (mode < NUM_MODES) { // if still profiling
        return mode;
    } else {
        if (startTime > 0) {
            // if the best mode for each lock has not been
            // determined, try to lock profileStartTime
            if (CAS(&profileStartTime, startTime, -1)) {
                computeBestLockModes( );
                profileStartTime = 0; // unlock
            }
        }
        if (QUANTUM != -1)     {    // if mode timesharing is on
            long quantumElapsed = (now - startTime -
                PROFILE_TOTAL_TIME) % QUANTUM;
            if (quantumElapsed > lock->fastestModeSlice) {
                return lock->alternateMode;
            }
        }
    }
}
```

```
            return lock->fastestMode;
        }
    }
    void computeBestLockModes( ) {
        for each lock in locksToProfile {
            // compute fastest mode for lock
            long acqs[ ]; // acquisitions
            for each mode m, set acqs[m] = sum over all
                    threads j of lock->acquisitions[j] [m];
            lock->fastestMode = index of largest element of acqs
            lock->alternateMode = index of second largest element
                of acqs
            if (lock->fastestMode == NUM_MODES-1) {
                // the fastest mode lets both sockets run,
                // so there's no point in alternating modes.
                lock->fastestModeSlice = QUANTUM;
            } else {
                // the fast mode lets a single socket run.
                // we device the quantum between fastestMode
                // and alternateMode according to the solo
                // performance of each socket.
                lock->fastestModeSlice = timeSlice(acqs[0], acqs[1]);
            }
        }
    }
    int LockAcquire(Lock * lock) {
        while (true) {
            // check if we are allowed to acquire the lock
            int mode = getMode(lock);
            if (mode == getSocket( ) | | mode == NUM_MODES-1) {
                ++lock->acquisitions[getTid( ) ] [mode];
                return LockAcquireTLE(lock);
            }
        }
    }
    void ProfileAndThrottle(Lock ** locks) {
        // try to lock priofileStartTime
        if (CAS(&profileStartTime, 0, -1) {
            for each lock in locks {
                set all entries of lock-acquisitions to 0
            }
            locksToProfile = locks;
            profileStartTime = getCurrentTime( ); // unlock
        }
    }
```

While the above pseudo-code uses the term 'acquisition' (as in the acquisitions[ ][ ] array), in some embodiments, events other than lock acquisitions may be tracked, monitored and/or recorded. For example, in one TLE-based embodiment, the number of calls to an underlying LockAcquireTLE function (which may acquire or elide the lock) may be recorded, such as in the acquisitions[ ][ ] array above. In general, virtually any statistic pertaining to the execution of critical sections may be monitored, tracked and/or recorded, according to various embodiments. Additionally, as shown in the above pseudo-code, a timeSlice routine may be used to determine the size of a time slice to be allocated to the best (or fastest) mode for a given lock. Thus, as noted above, the profiling session may determine relative amounts of times (e.g., indicated as a ratio or actual lengths of time) to be used when executing under particular socket scheduling modes. For simplicity reasons, no particular example implementation of a timeSlice routine is provided. However, a number of potential implementations should be apparent from the description herein.

How NUMA Affects HTM

As described above, the behavior of HTM on a large multi-socket machine may differ from the behavior of smaller systems in ways that present challenges for scaling the performance on the larger machine. This section describes an analysis of what may happen when a TLE algorithm designed for a single-socket 8-thread HTM system is run on a 72-thread NUMA HTM system, according to one example embodiment. Several issues may cause performance to degrade at moderate thread counts, even on a single socket. Additionally, the NUMA effects at the boundary between sockets may have a negative impact on transactional abort rates, according to some embodiments.

An implementation of an AVL tree was considered, in which each operation (insertion, deletion and search) is protected by a global lock. The standard TLE technique was applied as follows. A process attempts its operation transactionally up to r times, after which it falls back and acquires the lock. A limit of five retries is recommended by at least one processor manufacturer and echoed throughout the literature on HTM. An examination was conducted to determine whether this recommendation remains appropriate on a larger system. The effect of a common optimization employed by algorithms for small HTM machines was considered: specifically, immediately falling back to the lock after an overflow abort.

Figure 9:
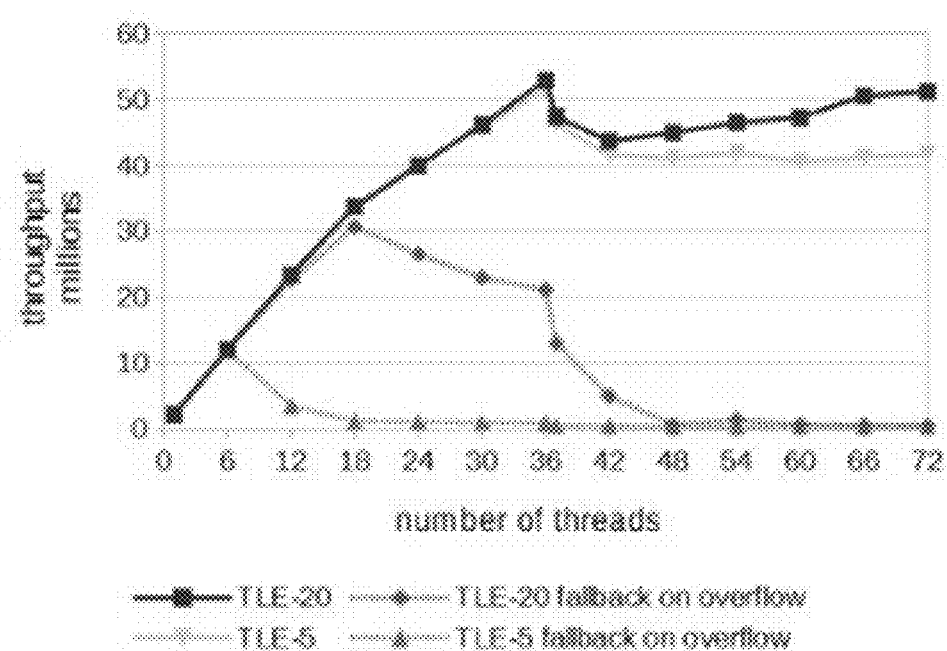

FIG. 9 shows the results of a microbenchmark on the large HTM system wherein processes perform insertions and deletions in an AVL tree which contains approximately 65536 keys. More specifically, FIG. 9 illustrates the use of TLE with different retry policies on large HTM system using AVL tree with 50% insertion and 50% deletion for key range [0, 131072). The figure contains four different curves, each representing a different retry policy. TLE-5 (TLE-20) attempts a transactional critical section up to 5 (resp., 20) times before falling back to the lock. If a transaction aborts because the lock was held, or if the lock is held just after an abort, then the attempt is not counted against the limit on the number of retries, and the thread waits until the lock is no longer held before retrying. TLE-5 fallback on overflow and TLE-20 fallback on overflow are versions of TLE-5 and TLE-20, respectively, that immediately fall back to the lock after an overflow abort. In all graphs for the large HTM system, threads are pinned such that threads 1-36 run on the first socket, and threads 37-72 run on the second socket.

Although a maximum of five retries may be sufficient on a smaller system, the difference between TLE-5 fallback on overflow and TLE-20 fallback on overflow clearly demonstrates that more retries can be needed on a larger system. Whereas on an 8-thread system, taking the lock means blocking seven other threads, on a 72-thread system, taking a lock (and blocking 71 other threads) is extremely costly. Consequently, on the large HTM system, it may be beneficial to tolerate a larger number of failed transactions if, by doing so, a thread can avoid taking the lock as often. It is natural to ask whether the performance of TLE-20 fallback on overflow could be further improved by allowing even more retries. After trying a fairly exhaustive set of data points, performance was improved only by approximately 10%.

Although performance cannot be significantly improved with more retries, it can be more than doubled at 36 threads (and enormously improved at larger thread counts) by eliminating the optimization to fall back after an overflow abort. It was observed that overflow aborts often resolve themselves (meaning that the transaction succeeds if retried), even with a single thread. Consequently, this optimization often causes threads to fall back and acquire the lock unnecessarily. Additionally, overflow aborts occur more frequently on the large HTM system.

Unfortunately, even the best TLE algorithm, TLE-20, may fail to scale beyond 36 threads. The drop in performance occurs at 37 threads, when the first socket is saturated and a single thread is running on the second socket. This is caused by NUMA effects, which are described in the remainder of this section. The remaining discussions involve TLE-20, unless otherwise specified.

Figure 10:
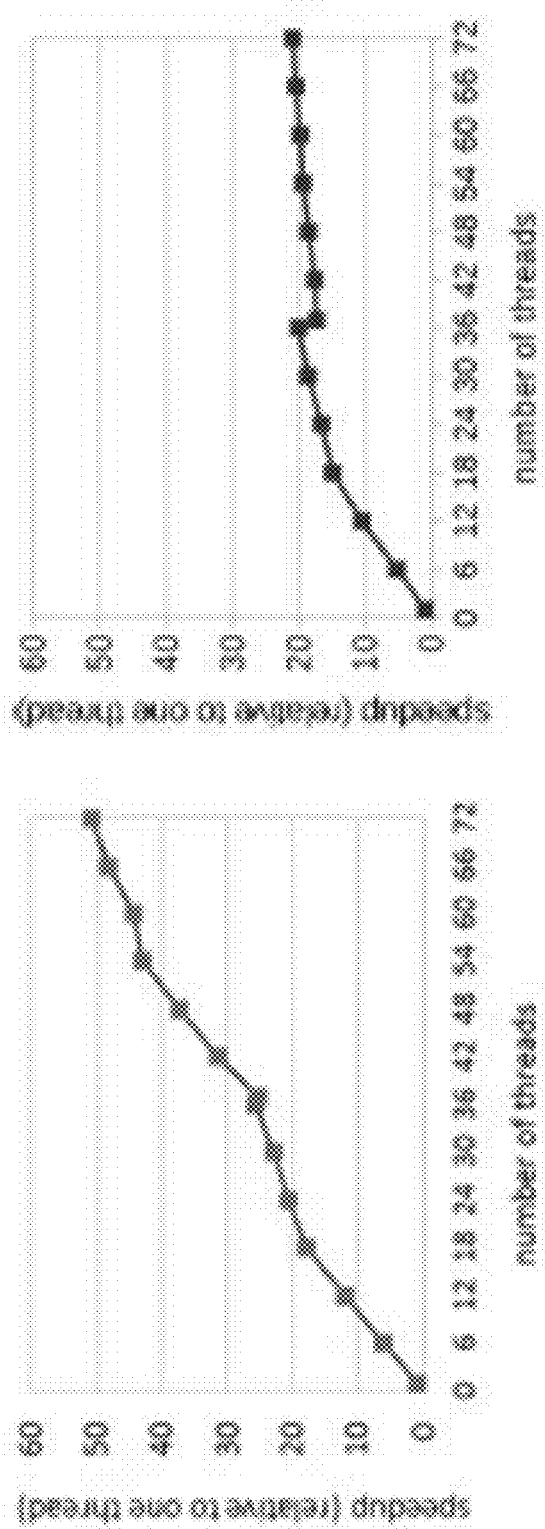

For a read-only workload in an AVL tree which contains approximately 1024 keys, TLE scales all the way to 72 threads on the big HTM system (see FIG. 10, which illustrates the use of TLE with an AVL tree on large HTM system with 100% search workload (left), and 1% insertion and 1% deletion workload (right)). However, performing just 1% insertion and 1% deletion flattens the curve after 36 threads, and completely negates the benefit of the second socket (see FIG. 10). And as seen in FIG. 8, this problem may be much worse when all operations are insertions or deletions: Adding a single thread on the second socket cuts performance in half, and performance at 72 threads is reduced almost to that of a single thread.

Figure 11:
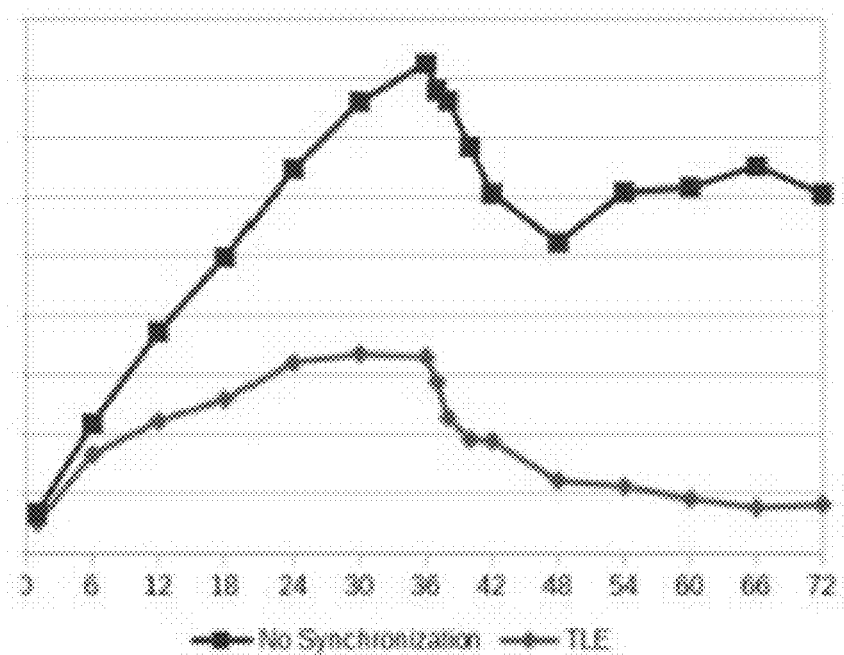

The negative performance impact of NUMA effects on non-transactional algorithms is well known, but the results in FIG. 8 are so striking that they demand careful study. A simple experiment was designed to compare the performance of an update-heavy workload using no synchronization, and using TLE, to determine whether NUMA effects are disproportionately worse with transactions. In this experiment, an AVL tree is first prefilled to contain approximately half of the key range [0, 131072], then each thread repeatedly performs a search-and-replace operation, which consists of the following steps. First, search for a uniformly random key in the key range. Let u be the last node visited by the search, and k be its key. (This node may be internal, or a leaf.) Next, write k into the key field of u. This write does not actually change the key of u, so search-and-replace can be implemented without any synchronization. The results in FIG. 11 show that the negative impact on TLE is significantly worse. At 72 threads, the TLE algorithm barely exceeds its single-threaded performance, whereas the algorithm with no synchronization exceeds its performance with 18 threads. More specifically, FIG. 11 illustrates the results of an experiment comparing the performance of a simple algorithm using no synchronization, and using TLE (where up is good.)

Figure 12:
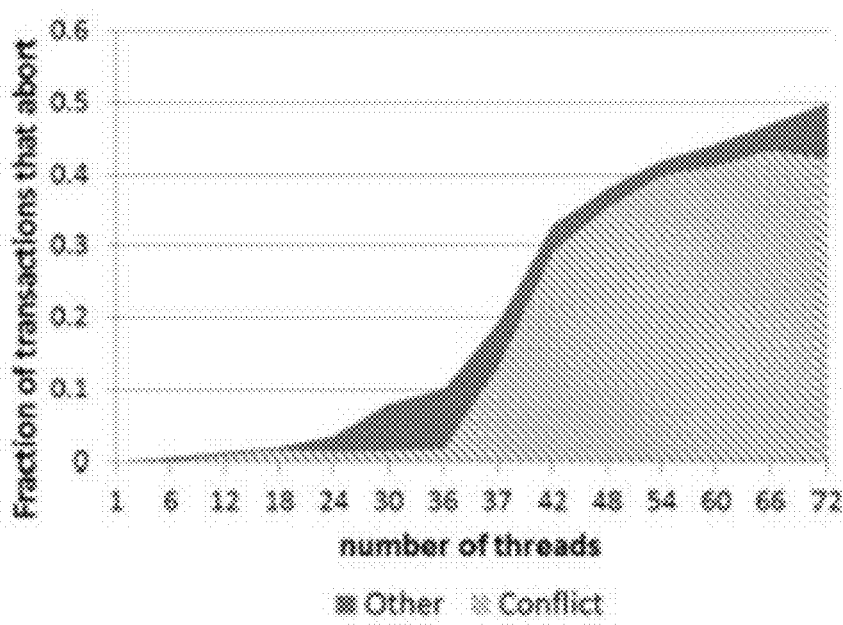

To understand why the TLE algorithm experiences such a severe drop in performance, the number of transaction attempts that aborted was tracked, along with the reasons for these aborts. According to FIG. 12 (which illustrates the abort rate for the TLE curve in FIG. 11—noting that the x-axis is not to scale near x=37), the fraction of transactions that abort dramatically increases as threads are added on the second socket, from 10% at 36 threads to 33% at only 42 threads. The vast majority of these aborts are reported by the HTM system as data conflicts.

It was hypothesized that these aborts occur because of cross-socket cache invalidations. When a process reads a key, if the cache line containing this key is already in the process' cache, then the read is extremely fast. If not, the cache line may need to be loaded, either from another processor's cache, or from main memory, at a much greater cost. If a process p is about to read from a cache line that is in its cache, and another process q first writes to that cache line, then q will invalidate p's cached copy, forcing p to fetch that cache line from elsewhere. This is fairly inexpensive if p and q are running on the same socket, since caches are shared. However, if p and q are running on different sockets, then the cache line may need to be sent across the interconnect, which is prohibitively expensive. For instance, threads on the second socket cause a series of cache invalidations which threads on the first socket have to slow down to deal with (e.g., by filling cache misses).

Fetching cache lines from across the interconnect inside a transaction lengthens the time needed to perform the transaction. This, in turn, lengthens the window of contention, wherein other transactions can conflict with it. Consequently, data conflicts become more likely. The hypothesis explains why performance is poor with even a single thread on the second socket: Operations performed on the second socket can cause cache misses on the first socket. It can also explain why read-only workloads scale on both sockets: Threads do not cause cross-socket cache invalidations. Similarly, it explains why the impact of the NUMA effect on TLE-20 is more severe in FIG. 8 than in FIG. 9: in the smaller tree, there is a higher change of conflicts, and operations may complete more frequently, so more cache invalidations may occur.

Figure 13:
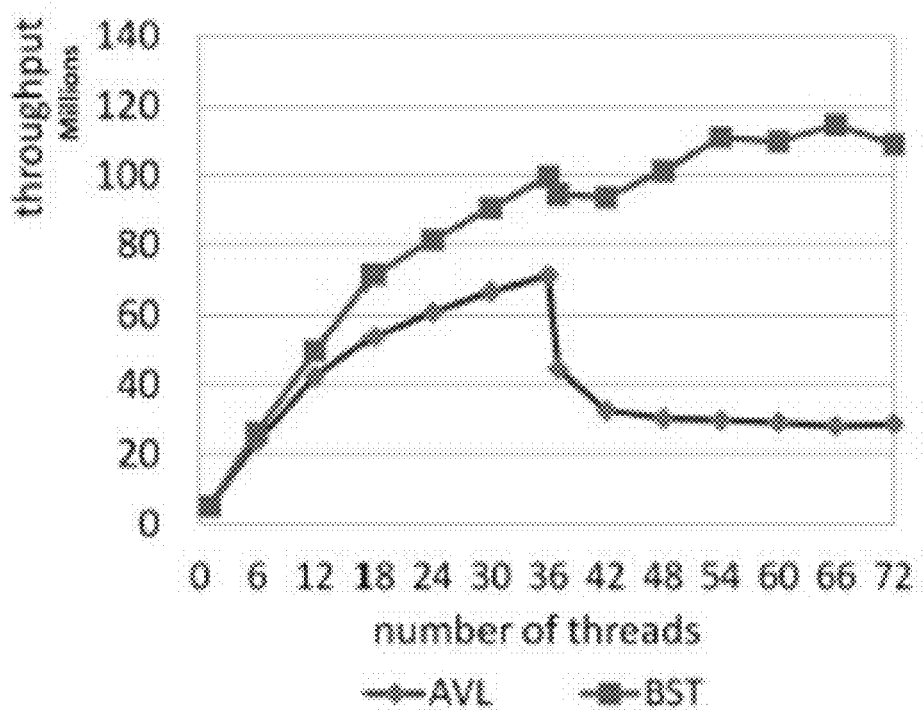

The hypothesis also predicts that NUMA effects will be less significant for leaf-oriented trees, where each update modifies only a leaf, or the parent of a leaf. In such a tree, threads can only cause cross-socket cache invalidations near leaves. So, the top of the tree is likely to remain cached. This prediction was tested using an unbalanced binary search tree, and it had significantly better scaling than the AVL tree. FIG. 13 compares the AVL tree and a leaf-oriented BST, each containing approximately 1024 keys, with 10% insertion, 10% deletion and 90% search.

Figure 14:
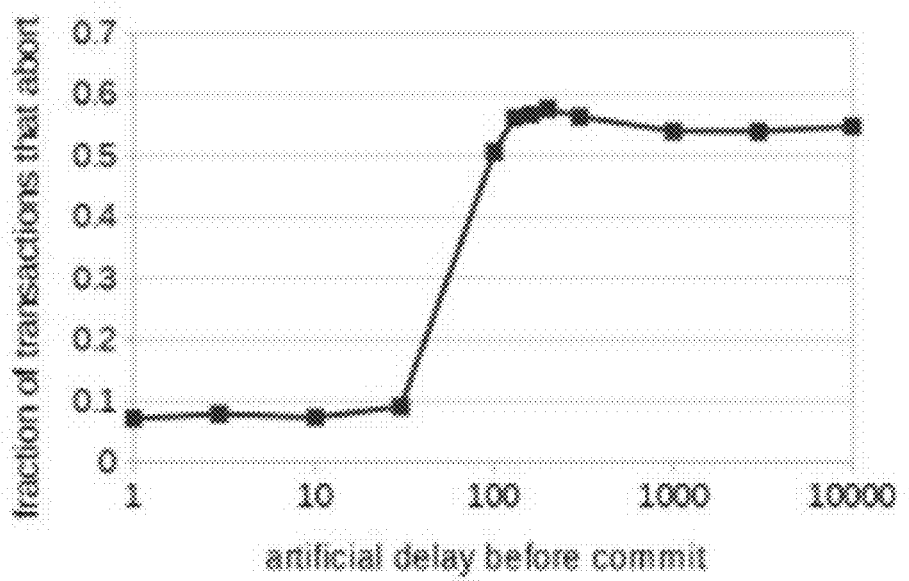

To confirm the hypothesis, a 36 thread single-socket experiment was run in which some artificial delay (spinning) was added just before committing each transaction. The results in FIG. 14 (which illustrates the abort rate for a 36 thread single-socket experiment where some delay is inserted before committing each transaction and the unit of delay is a small, constant number of instructions) show that, with a certain amount of delay, the abort rate jumps significantly, mimicking the results on two sockets. This provides strong evidence for the hypothesis.

Experimental Results

In this section, a selection of results from a large suite of microbenchmarks is presented. Three data structures were implemented: an AVL tree, an unbalanced BST, and a skip-list. Each data structure was then paired with TLE, TLEStarve and TLEShare. TLEStarve and TLEShare profile each lock mode for 10 milliseconds before moving on to the next mode. TLEShare uses 100 millisecond quanta for time sharing. That is, each lock changes modes twice every 100 milliseconds.

Each data point in the graphs represents an average of a set of timed trials, each lasting approximately 10 seconds. In each trial, a fixed number of threads repeatedly perform random operations according to some workload, on random keys uniformly drawn from a fixed key range. Before a trial begins, the data structure is prefilled so that it contains half of its key range. For TLEStarve and TLEShare, ProfileAndThrottle is invoked by the main thread approximately 50 milliseconds after a trial starts (to give all threads time to begin working and warm up their caches before profiling begins).

Figure 16:
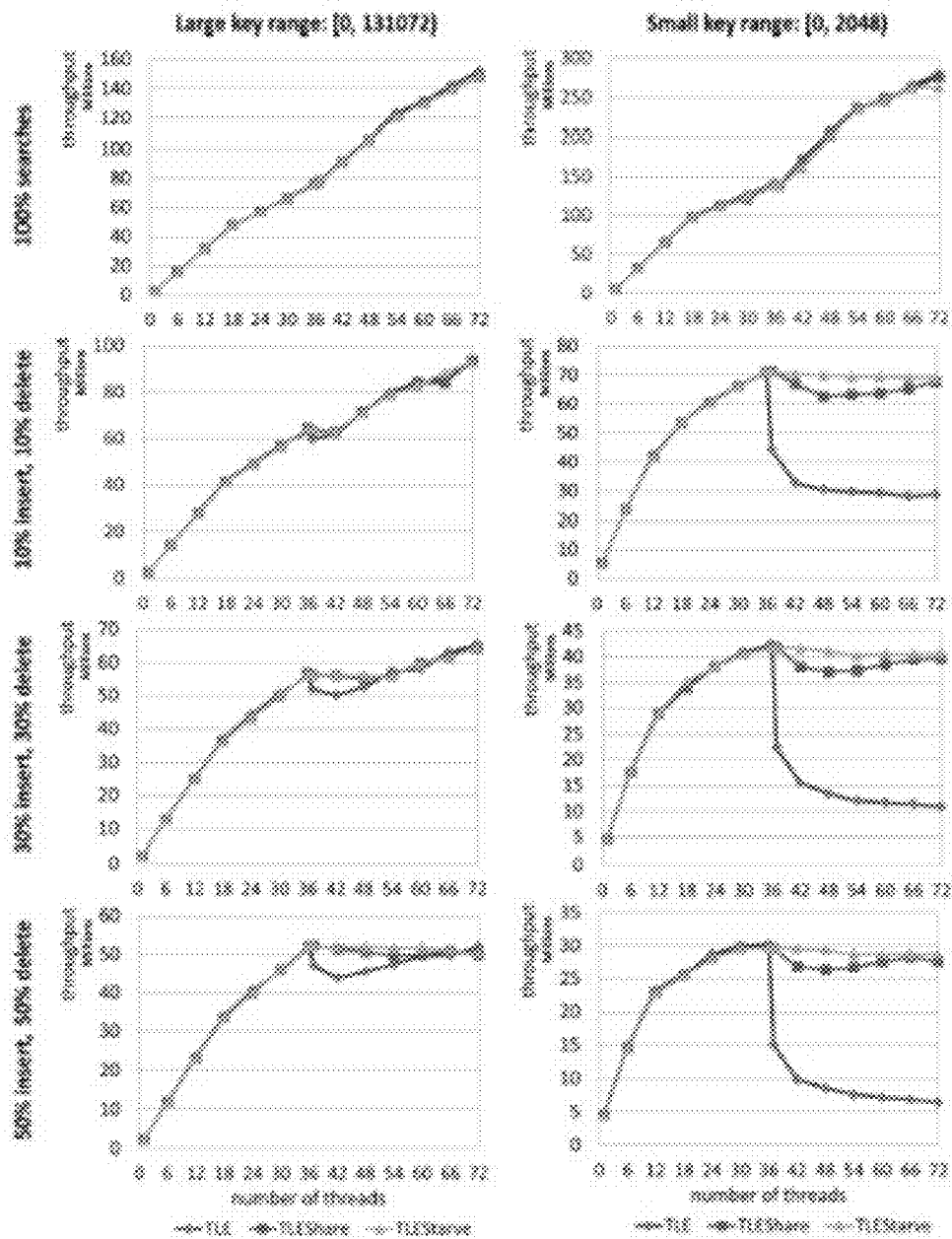
Figure 17:
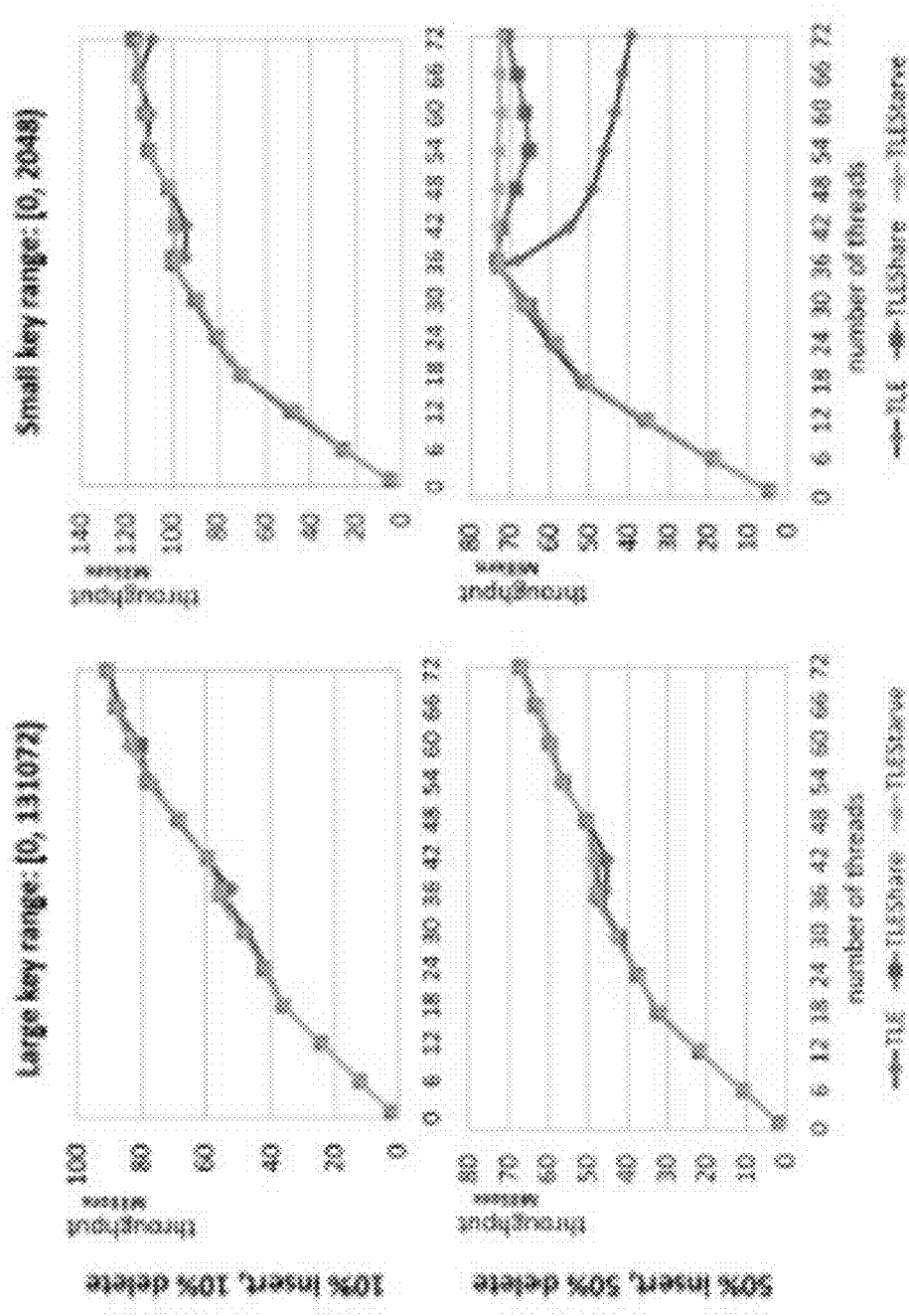
Figure 18:
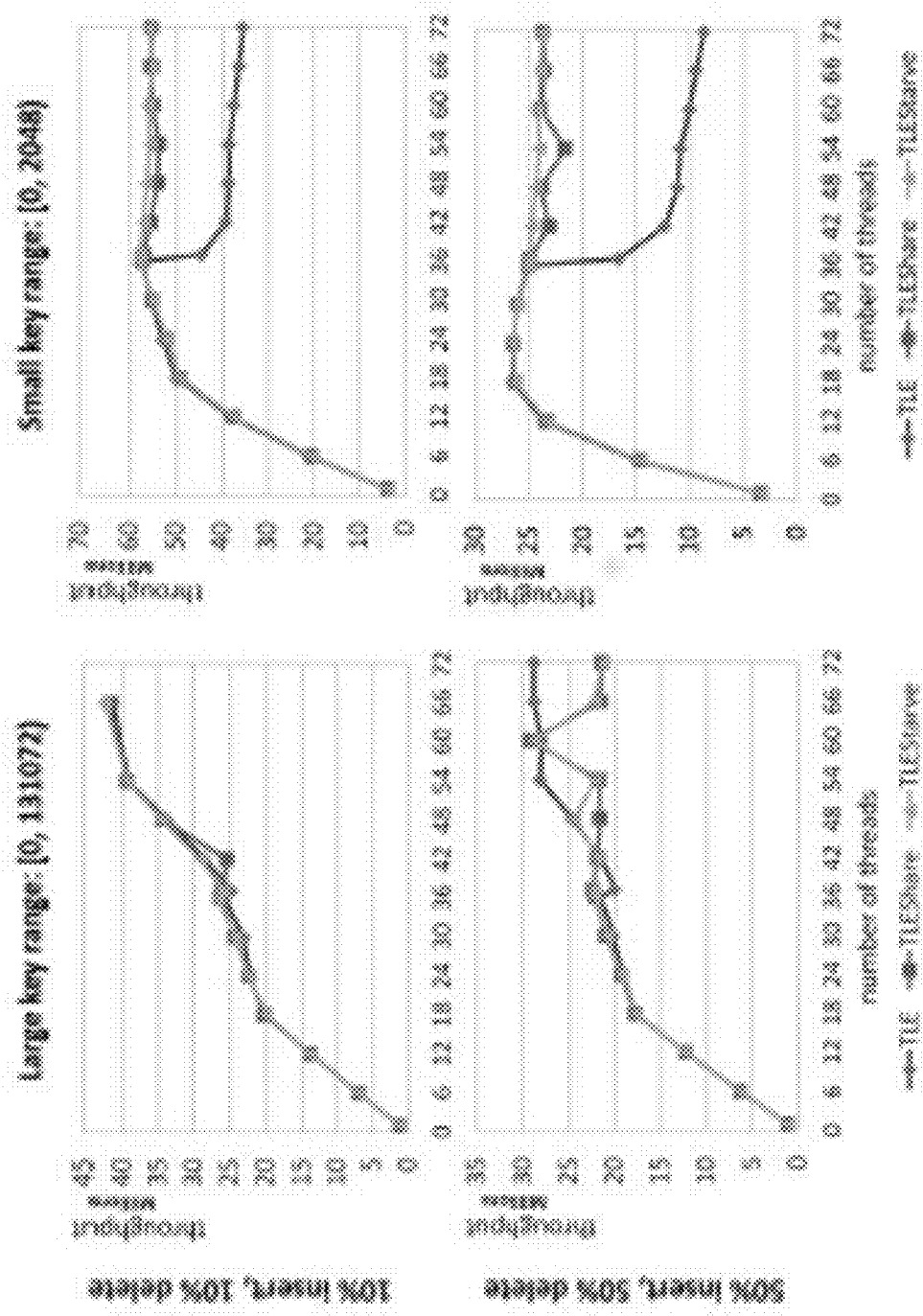

The results for the simplest experiments, which appear in FIG. 16, FIG. 17 and FIG. 18, cover four workloads: 100% searches (0i0d), 10% insertion and 10% deletion (10i10d), 30% insertion and 30% deletion (30i30d), and 50% insertion and 50% deletion (50i50d). In all of these figures, throughput (in terms of operations per second) is plotted versus the number of threads.

The results for AVL trees appear in FIG. 16. For the read-only workload, all algorithms scale, for both large and small trees. The reductions in slope at 18-36 threads and 54-72 threads occur because of hyperthreading. (For thread counts 1 through 18, each core on the first socket runs a single thread. However, for thread counts 19-36, each core runs two threads. Similar remarks hold for the second socket.)

Although scaling is good for the read-only workload, it worsens as the number of insertions and deletions increases. In the small tree, TLE already fails to scale on two sockets with only 20% updates. Scaling is generally better in the large tree. In the small tree, more operations conflict on keys they modify, so cache misses may be more frequent. In the large tree, less conflicts are expected, so cross-socket cache invalidations may be less impactful. In all cases, the new algorithms take full advantage of two sockets when workloads scale, and have little or no performance degradation above 36 threads for workloads that do not scale.

The results for the unbalanced BST appear in FIG. 17. The graphs for workloads 0i0d and 30i30d are omitted, because the 0i0d graphs are similar to those for the AVL tree, and the 30i30d graphs are similar to the 50i50d graphs.

For the unbalanced BST, there was much less performance degradation for TLE on the second socket. In fact, TLE continues to scale on two sockets for workload 10i10d with the small key range, where it plummeted for the AVL tree. Even workload 50i50d with the large key range scales beyond one socket. As previously noted, this is exactly what would be expected if the hypothesis about cross socket cache invalidations were true.

Next, the results for the skip-list appear in FIG. 18. Similar to the unbalanced BST, the graphs for workloads 0i0d and 30i30d are omitted. The skip-list performs more similarly to the AVL tree than to the unbalanced BST. The performance degradation of TLE on the second socket is slightly less severe than for the AVL tree, but is still debilitating.

Related Work

Although TLE is known for almost fifteen years, it became an attractive and practical synchronization tool with the introduction of HTM into commercial architectures a few years ago. Numerous studies have observed that TLE provides nearly ideal speedups when applied to workloads in which threads do not have many data conflicts and transactions fit into the HTM capacity.

However, when these conditions do not hold, the performance of TLE may deteriorate quickly. Several recent papers have suggested ways to improve the performance of TLE in these scenarios, employing various approaches such as adaptively tuning retry policies, introducing auxiliary locks, etc. All these papers, however, evaluated TLE and suggested improvements using relatively small, single-socket machines.

The effects of NUMA on the performance of multi-threaded systems has been an area of active research in the last few decades. The general observation is that the number of remote memory accesses and remote cache misses, i.e., cache misses served from another cache located on a different socket, should be reduced as they are very expensive. One approach, for instance, achieves this goal through the design of a series of NUMA-aware cohort locks, which allow threads running on the same socket to pass the lock between them (and thus exploit local cache locality) before handing the lock over to a thread running on a different socket. Other researchers consider careful placement of threads close to the data they are going to access, which can be achieved, e.g., through thread migration or data migration and replication.

Delegation is another approach aimed to reduce the number of remote cache misses. The idea of delegation is to mediate the access to a data structure or to a critical section by one or more server threads, which execute access requests from client threads. The communication between server and client threads is done by means of message passing implemented on top of shared memory. As an example, others have proposed structuring a client-server system in which server threads running on dedicated cores execute critical sections on behalf of client threads. Note that in order to enable delegation of critical sections, some effort is required to encapsulate the code of critical sections into functions. In another example, others have investigated different approaches for implementing message passing and show that while delegation can be effective, the communication overhead of message passing can often outweigh its benefits.

Experimentation with delegation was explored as a way to reduce conflicts, and indeed, delegation managed to significantly lower the abort rate and the time spent executing transactions. However, delegation introduced significant overheads both in communicating the operations and their results between the thread that invoked the operation and the one that actually performs it (on the other socket), and also in the invoking thread waiting for its delegated operation to be performed. This overhead was too high for the reduction in execution time achieved by delegation to yield significant improvements.

Computing System

Figure 19:
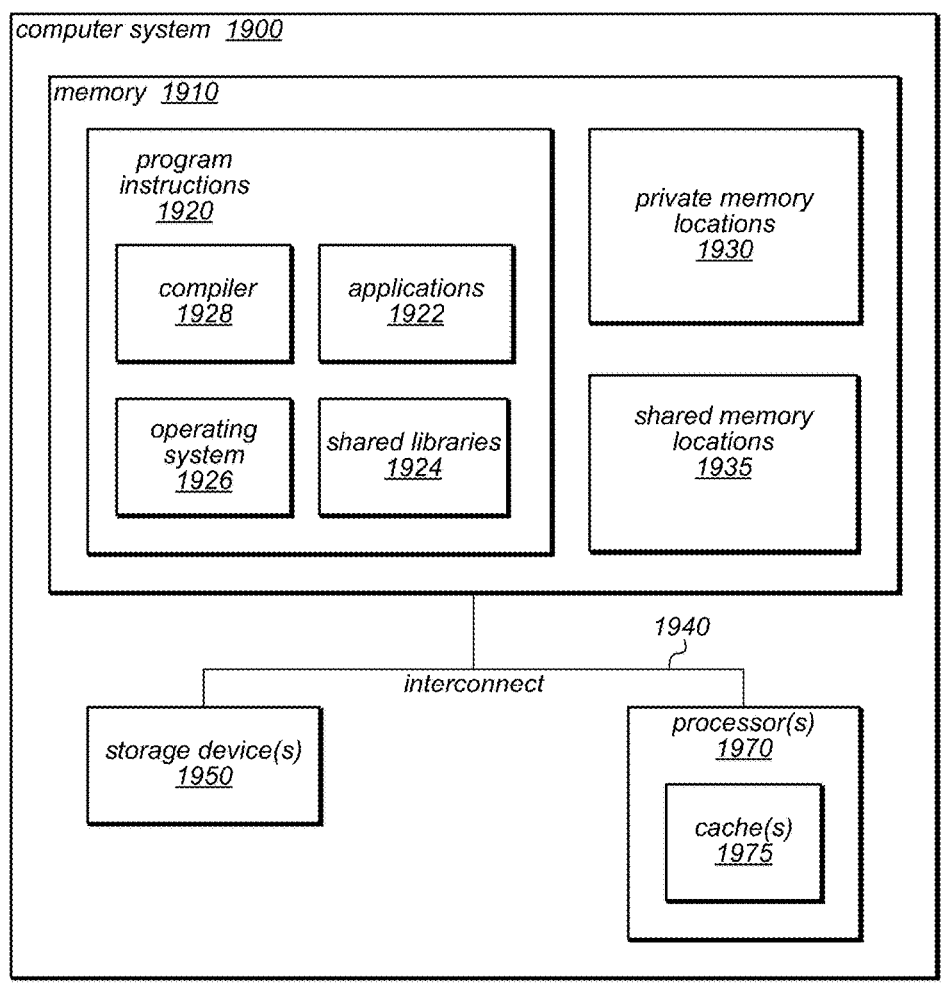
FIG. 19 is a block diagram illustrating one embodiment of a computing system that is configured to implement the mechanisms described herein.

The techniques and methods described herein for improving the performance of hardware transactions may be implemented on or by any of a variety of computing systems, in different embodiments. For example, FIG. 19 is a block diagram illustrating one embodiment of a computing system that is configured to implement such techniques and methods, as described herein, according to various embodiments. The computer system 1900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device. In some embodiments, computer system 1900 may be a computing node in a system that implements a NUMA architecture.

Some of the mechanisms for improving the performance of hardware transactions, as described herein, may be provided as a computer program product, or software, that may include a non-transitory, computer-readable storage medium having stored thereon instructions, which may be used to program a computer system 1900 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1900 may include one or more processors 1970; each may include multiple cores, any of which may be single- or multi-threaded. For example, multiple processor cores may be included in a single processor chip (e.g., a single processor 1970), and multiple processor chips may be included in computer system 1900. Each of the processors 1970 may include a cache or a hierarchy of caches 1975, in various embodiments. For example, each processor chip 1970 may include multiple L1 caches (e.g., one per processor core) and one or more other caches (which may be shared by the processor cores on a single processor). In some embodiments, hardware support for HTM may be implemented within caches 1975 and/or within other components of processors 1970 or computer system 1900. The computer system 1900 may also include one or more storage devices 1950 (e.g. optical storage, magnetic storage, hard drive, tape drive, solid state memory, etc.) and one or more system memories 1910 (e.g., one or more of cache, SRAM, DRAM, RDRAM, EDO RAM, DDR 10 RAM, SDRAM, Rambus RAM, EEPROM, etc.). In some embodiments, one or more of the storage device(s) 1950 may be implemented as a module on a memory bus (e.g., on interconnect 1940) that is similar in form and/or function to a single in-line memory module (SIMM) or to a dual in-line memory module (DIMM). Various embodiments may include fewer or additional components not illustrated in FIG. 19 (e.g., video cards, audio cards, additional network interfaces, peripheral devices, a network interface such as an ATM interface, an Ethernet interface, a Frame Relay interface, etc.)

The one or more processors 1970, the storage device(s) 1950, and the system memory 1910 may be coupled to the system interconnect 1940. One or more of the system memories 1910 may contain program instructions 1920. Program instructions 1920 may be executable to implement one or more applications 1922 (which may include source code and/or executable code for a multithreaded application that accesses shared resources), shared libraries 1924, or operating systems 1926. In some embodiments, program instructions 1920 may include a compiler 1928. In some embodiments, program instructions 1920 may be executable to implement a contention manager (not shown). In some embodiments, program instructions 1920 (or more specifically, shared libraries 1924) may include methods for improving the performance of hardware transactions, or any other methods that may be invoked by applications 1922.

Program instructions 1920 may be encoded in platform native binary, any interpreted language such as Java™ byte-code, or in any other language such as C/C++, the Java™ programming language, etc., or in any combination thereof. In various embodiments, optimizing compiler 1928, applications 1922, operating system 1926, and/or shared libraries 1924 may each be implemented in any of various programming languages or methods. For example, in one embodiment, optimizing compiler 1928 and operating system 1926 may be based on the Java programming language, while in another embodiment they may be written using the C or C++ programming languages. Similarly, applications 1922 may be written using the Java programming language, C, C++, or another programming language, according to various embodiments. Moreover, in some embodiments, optimizing compiler 1928, applications 1922, operating system 1926, and/shared libraries 1924 may not be implemented using the same programming language. For example, applications 1922 may be C++ based, while optimizing compiler 1928 may be developed using C.

In some embodiments, the program instructions 1920 may include transactional memory support and/or other functions, operations, or procedures for implementing multi-threaded applications that access shared resources, as described herein. Such support and functions may exist in one or more of the shared libraries 1924 (one of which may include a transaction support library), operating systems 1926, or applications 1922, in various embodiments. The system memory 1910 may further comprise private memory locations 1930 and/or shared memory locations 1935 where data may be stored. For example, in some embodiments, shared memory locations 1935 (which may be implemented as a hardware transactional memory) may store data, metadata, or other shared resources that are accessible to multiple, concurrently executing threads, processes, or transactions, in various embodiments. In some embodiments, private memory locations 1930 and/or shared memory locations 1935 may store thread-local flags, lock state information, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein and in which different embodiments of the underlying hardware that supports HTM described herein are supported or implemented. It is intended that the following claims be interpreted to embrace all such variations and modifications.

What is claimed:

1. A method, comprising:
performing by one or more computing nodes in a multi-socket system that supports multithreading and that implements a hardware transactional memory:
  beginning execution, on the multi-socket system, of a multithreaded application that includes accesses to a shared resource, wherein the shared resource is accessible by a plurality of threads of the multi-threaded application;
  attempting, by a particular thread of the plurality of threads, to execute a critical section of the multi-threaded application on a particular socket of the multi-socket system;
  determining, based at least in part, on a current socket scheduling mode, whether the particular thread is allowed to currently execute the critical section on the particular socket, wherein the current socket scheduling mode is one of a plurality of socket scheduling modes, wherein the current socket scheduling mode indicates whether the particular thread may execute the critical section on the particular socket.

2. The method of claim 1, wherein said attempting to execute the critical section comprises one of:
  attempting to acquire a lock protecting the shared resource; or
  attempting to run a hardware transaction.

3. The method of claim 1, further comprising:
  completing execution of the critical section, by the particular thread, based, at least in part, in response to determining that the current socket scheduling mode indicates that the particular thread is allowed to currently execute the critical section on the particular socket.

4. The method of claim 1, further comprising:
blocking the particular thread in response to determining that the current socket scheduling mode indicates that the particular thread is not allowed to currently execute the critical section on the particular socket.

5. The method of claim 1, further comprising:
profiling the multithreaded application, wherein said profiling comprising:
iterating over the plurality of socket scheduling modes; and
tracking, for individual threads and in individual ones of the plurality of socket scheduling modes, statistics pertaining to execution attempts, by a respective thread, of a critical section during the profiling operation.

6. The method of claim 5, wherein said profiling further comprises:
determining, dependent on the tracked information, a best socket scheduling mode of the plurality of socket scheduling modes, wherein the best socket scheduling mode achieves better performance according to a particular performance metric than others of the plurality of socket scheduling modes; and
applying the best socket scheduling mode during subsequent execution of the multithreaded application.

7. The method of claim 6, wherein said profiling further comprises:
determining, dependent on the tracked information, an alternate socket scheduling mode of the plurality of socket scheduling modes, wherein the alternate socket scheduling mode achieves lower performance according to the particular performance metric than the best socket scheduling mode; and
applying the alternate socket scheduling mode during subsequent execution of the multithreaded application, wherein the best socket scheduling mode and the alternate socket scheduling mode are applied alternately during subsequent execution of the multithreaded application.

8. The method of claim 7, wherein said profiling further comprises determining a ratio indicating relative amounts of time and according to which the best socket scheduling mode and the alternate socket scheduling mode are applied alternately during subsequent execution of the multithreaded application.

9. A system, comprising:
a plurality of processor cores in multiple sockets;
a hardware transactional memory; and
another memory coupled to the plurality of processor cores;
wherein the other memory stores program instructions that when executed on the one or more processor cores cause the plurality of processor cores to implement a multithreaded application that comprises a plurality of accesses to a shared resource, wherein the shared resource is accessible by a plurality of threads of the multithreaded application;
wherein, when executed on the one or more processor cores, the program instructions cause the plurality of processor cores to:
begin execution, on the multi-socket system, of the multithreaded application, wherein the shared resource is accessible by a plurality of threads of the multithreaded application;
attempt, by a particular thread of the plurality of threads, to execute a critical section of the multithreaded application on a particular socket of the multi-socket system;
determine, based at least in part, on a current socket scheduling mode, whether the particular thread is allowed to execute the critical section on the particular socket, wherein the current socket scheduling mode is one of a plurality of socket scheduling modes, wherein the current socket scheduling mode indicates where the particular thread may execute the critical section on the particular socket.

10. The system of claim 9, wherein to attempt to execute the critical section, the program instructions further cause the plurality of processor cores to:
attempt to acquire a lock protecting the shared resource; or
attempt to run a hardware transaction.

11. The system of claim 9, wherein, when executed on the one or more processor cores, the program instructions further cause the plurality of processor cores to:
complete execution of the critical section, by the particular thread, based at least in part, in response to determining that the current socket scheduling mode indicates that the particular thread is allowed to execute the critical section on the particular socket.

12. The system of claim 9, wherein, when executed on the one or more processor cores, the program instructions further cause the plurality of processor cores to:
block the particular thread in response to determining that the current socket scheduling mode indicates that the particular thread is not allowed to execute the critical section on the particular socket.

13. The system of claim 9, wherein, when executed on the one or more processor cores, the program instructions further cause the plurality of processor cores to:
profile the multithreaded application, wherein to profile the multithreaded application, the program instructions further cause the plurality of processor cores to:
iterate over the plurality of socket scheduling modes; and
track, for individual threads and in individual ones of the plurality of socket scheduling modes, statistics pertaining to execution attempts, by a respective thread, of a critical section during the profiling operation.

14. The system of claim 13, wherein to profile the multithreaded application, the program instructions further cause the plurality of processor cores to:
determine, dependent on the tracked information, a best socket scheduling mode of the plurality of socket scheduling modes, wherein the best socket scheduling mode achieves better performance according to a particular performance metric than others of the plurality of socket scheduling modes; and
apply the best socket scheduling mode during subsequent execution of the multithreaded application.

15. The system of claim 14, wherein to profile the multithreaded application, the program instructions further cause the plurality of processor cores to:
determine, dependent on the tracked information, an alternate socket scheduling mode of the plurality of socket scheduling modes, wherein the alternate socket scheduling mode achieves lower performance according to the particular performance metric than the best socket scheduling mode; and apply the alternate socket scheduling mode during subsequent execution of the multithreaded application, wherein the best socket scheduling mode and the alternate socket scheduling mode are applied alternately during subsequent execution of the multithreaded application.

16. The system of claim 15, wherein to profile the multithreaded application, the program instructions further cause the plurality of processor cores to determine a ratio indicating relative amounts of time and according to which the best socket scheduling mode and the alternate socket scheduling mode are applied alternately during subsequent execution of the multithreaded application.

17. A non-transitory, computer-readable storage medium storing program instructions that when executed on one or more computers cause the one or more computers to perform:
   beginning execution, on the multi-socket system, of a multithreaded application, in a multi-socket system that supports multithreading and that implements a hardware transactional memory, that includes accesses to a shared resource, wherein the shared resource is accessible by a plurality of threads of the multithreaded application;
   attempting, by a particular thread of the plurality of threads, to execute a critical section of the multithreaded application on a particular socket of the multi-socket system;
   determining, based at least in part, on a current socket scheduling mode, whether the particular thread is allowed to execute the critical section on the particular socket, wherein the current socket scheduling mode is one of a plurality of socket scheduling modes, wherein the current socket scheduling mode indicates where the particular thread may execute the critical section on the particular socket.

18. The storage medium of claim 17, wherein the program instructions further cause the one or more computers to perform:
   completing execution of the critical section by the particular thread, based as least in part, in response to determining that the current socket scheduling mode indicates that the particular thread is allowed to execute the critical section on the particular socket.

19. The storage medium of claim 17, wherein the program instructions further cause the one or more computers to perform:
   blocking the particular thread in response to determining that the current socket scheduling mode indicates that the particular thread is not allowed to execute the critical section on the particular socket.

20. The storage medium of claim 17, wherein the program instructions further cause the one or more computers to perform:
   profiling the multithreaded application, comprising:
      iterating over the plurality of socket scheduling modes; and
      tracking, for individual threads and in individual ones of the plurality of socket scheduling modes, statistics pertaining to execution attempts, by a respective thread, of a critical section during the profiling operation.

* * * * *

UNITED STATES PATENT AND TRADEMARK OFFICE
CERTIFICATE OF CORRECTION

PATENT NO. : 10,127,088 B2  Page 1 of 1
APPLICATION NO. : 15/263123
DATED : November 13, 2018
INVENTOR(S) : Kogan et al.

It is certified that error appears in the above-identified patent and that said Letters Patent is hereby corrected as shown below:

On the Title Page

Item (73) Assignee, Line 1, delete "Inrternational" and insert -- International --, therefor.

On page 2, Column 2, Item (56) under Other Publications, Line 1, delete "Bergey" and insert -- Sergey --, therefor.

In the Specification

In Column 7, Lines 22-23, delete "acquistions" and insert -- acquisitions --, therefor.

In Column 10, Line 8, delete "priofileStartTime" and insert -- profileStartTime --, therefor.

In Column 11, Line 36, delete "proflleStartTime" and insert -- profileStartTime --, therefor.

In Column 11, Line 39, delete "proflleStartTime" and insert -- profileStartTime --, therefor.

In Column 12, Line 67, delete "acquistions" and insert -- acquisitions --, therefor.

In Column 14, Line 30, delete "C like" and insert -- C-like --, therefor.

In Column 14, Line 35, delete "matadata" and insert -- metadata --, therefor.

In Column 15, Line 31, delete "priofileStartTime" and insert -- profileStartTime --, therefor.

In the Claims

In Column 26, Line 9, in Claim 18, delete "as" and insert -- at --, therefor.

Signed and Sealed this
Nineteenth Day of November, 2019

Andrei Iancu
*Director of the United States Patent and Trademark Office*